(12) United States Patent
Yoo et al.

(10) Patent No.: US 12,124,999 B2
(45) Date of Patent: Oct. 22, 2024

(54) METHOD AND SYSTEM FOR MANAGING AUTOMATIC EVALUATION MODEL FOR INTERVIEW VIDEO, AND COMPUTER-READABLE MEDIUM

(71) Applicant: GENESIS LAB, INC., Seoul (KR)

(72) Inventors: Daehun Yoo, Seoul (KR); Youngbok Lee, Seoul (KR)

(73) Assignee: GENESIS LAB, INC., Seoul (KR)

( * ) Notice: Subject to any disclaimer, the term of this patent is extended or adjusted under 35 U.S.C. 154(b) by 343 days.

(21) Appl. No.: 17/420,789

(22) PCT Filed: Jan. 2, 2020

(86) PCT No.: PCT/KR2020/000048
§ 371 (c)(1),
(2) Date: Jul. 6, 2021

(87) PCT Pub. No.: WO2020/145571
PCT Pub. Date: Jul. 16, 2020

(65) Prior Publication Data
US 2022/0076211 A1    Mar. 10, 2022

(30) Foreign Application Priority Data

Jan. 7, 2019  (KR) .................. 10-2019-0001804
Jul. 25, 2019  (KR) .................. 10-2019-0090341
Jul. 25, 2019  (KR) .................. 10-2019-0090351

(51) Int. Cl.
*G06Q 10/1053*  (2023.01)
*G06N 3/045*  (2023.01)
(Continued)

(52) U.S. Cl.
CPC ......... *G06Q 10/1053* (2013.01); *G06N 3/045* (2023.01); *G06Q 10/063112* (2013.01)

(58) Field of Classification Search
CPC ........... G06Q 10/1053; G06Q 10/0639; G06Q 10/063112; G06N 3/045; G06N 3/044; G06N 3/08
(Continued)

(56) References Cited

U.S. PATENT DOCUMENTS 8,751,231 B1 *  6/2014  Larsen .................... G10L 25/54
                                                    704/250
10,963,841 B2 *  3/2021  Olshansky ............. G10L 25/63
(Continued)

FOREIGN PATENT DOCUMENTS

JP         2017-219989       12/2017
KR    10-2016-0032433        3/2016
(Continued)

OTHER PUBLICATIONS

Naim, I., Tanveer, M. I., Gildea, D., & Hoque, M. E. (2016). Automated analysis and prediction of job interview performance. IEEE Transactions on Affective Computing, 9(2), 191-204 (Year: 2016).*

(Continued)

*Primary Examiner* — Jonathan P Ouellette

(57) ABSTRACT

The present invention relates to a method and a system for managing an automatic evaluation model for an interview video, and a computer-readable medium. A method for managing an evaluation model, according to one embodiment of the present invention, is performed in a server system having one or more processors and one or more memories, provides automatic evaluation results for an interview video of a subject to be evaluated, and comprises: a video evaluation result training step of training an evaluation model for providing automatic evaluation results for an interview video in the server system, according to video evaluation results of evaluators for the video of the interview conducted by the subject to be evaluated during an online (Continued)

interview; and a recruitment evaluation result training step of training the evaluation model for providing automatic evaluation results for the interview video in the server system, according to recruitment evaluation results for an actual recruitment interview of a company applied by the corresponding subject to be evaluated, wherein the evaluation model includes one or more artificial neural network models.

8 Claims, 28 Drawing Sheets

(51) Int. Cl.
*G06Q 10/06* (2023.01)
*G06Q 10/0631* (2023.01)
*G06Q 10/10* (2023.01)
*G06Q 10/105* (2023.01)
*G06Q 30/08* (2012.01)

(58) Field of Classification Search
USPC .................................................. 705/1.1–912
See application file for complete search history.

(56) References Cited

U.S. PATENT DOCUMENTS

| | | | |
|---|---|---|---|
| 2015/0199646 A1* | 7/2015 | Taylor | G06Q 10/1053 705/321 |
| 2015/0262130 A1* | 9/2015 | Taylor | G06F 16/24578 705/321 |
| 2015/0269529 A1* | 9/2015 | Kyllonen | G06Q 10/1053 705/321 |

FOREIGN PATENT DOCUMENTS

| | | |
|---|---|---|
| KR | 10-2017-0039951 | 4/2017 |
| KR | 10-2017-0050215 | 5/2017 |
| KR | 10-2017-0079159 | 7/2017 |
| KR | 10-1872733 | 6/2018 |
| KR | 10-1984283 | 5/2019 |
| WO | 2017-112914 | 6/2017 |

OTHER PUBLICATIONS

"Office Action for Korea Patent Application No. 10-2019-0090351, dated Nov. 23, 2020."
"PCT International Search Report and Written Opinion for International Application No. PCT/KR2020/000048, Date of Mailing: Jul. 2, 2020".

* cited by examiner

FIG. 4
(A)
(B)
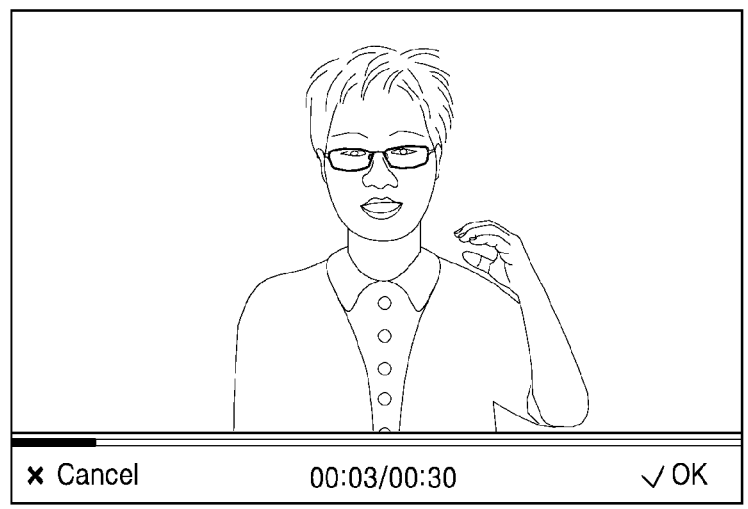

FIG. 16

FIG. 17
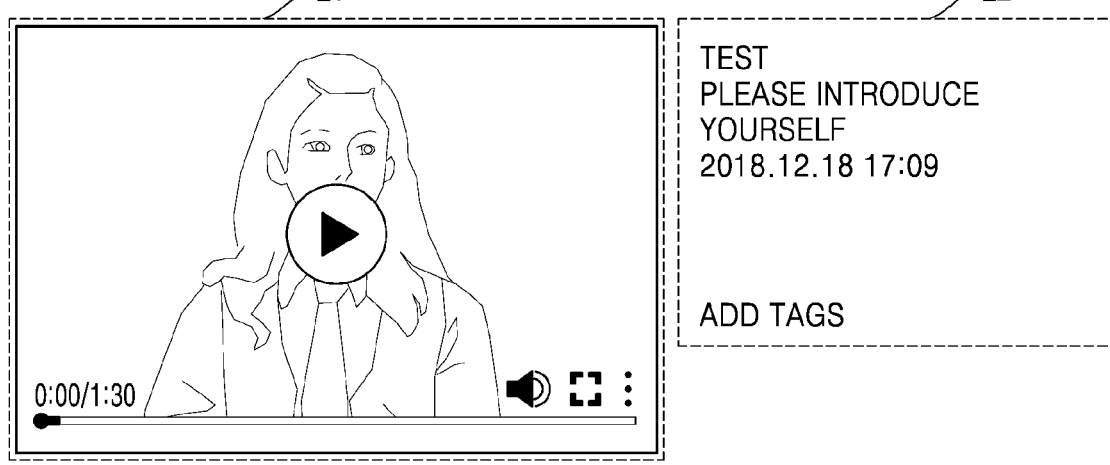
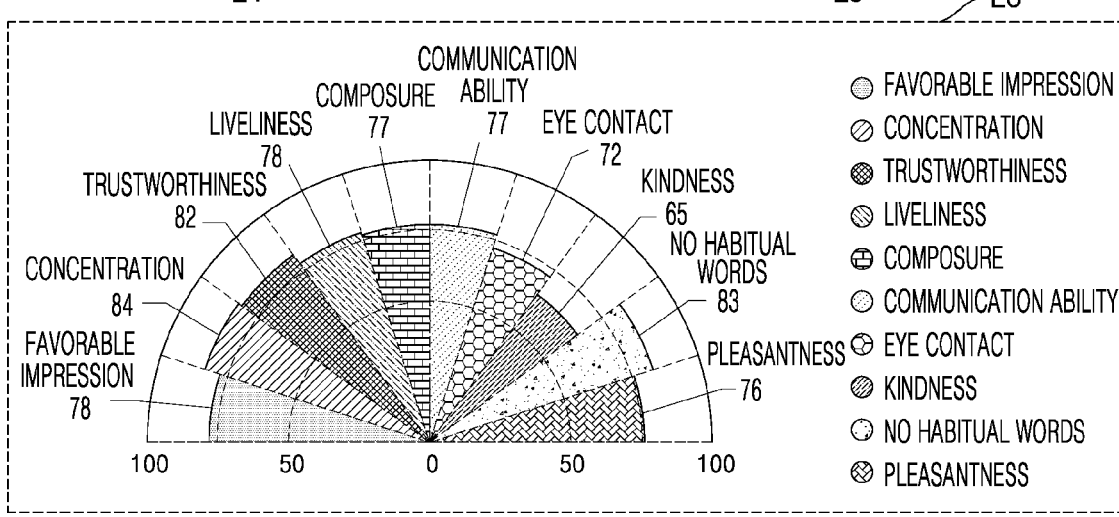

FIG. 18

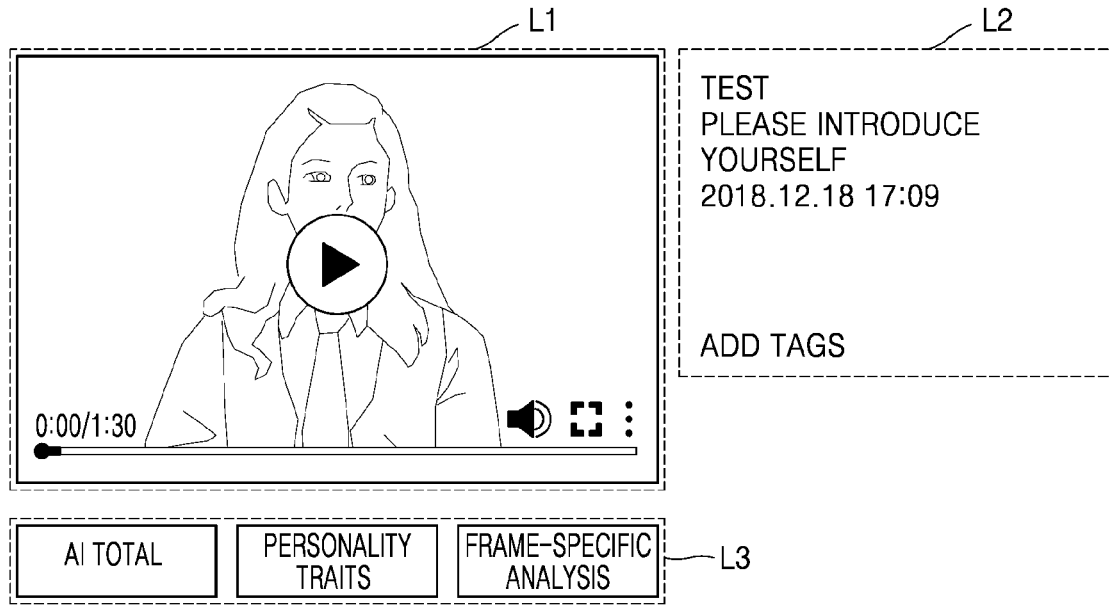

FOLLOWS ARE 5 APPARENT PERSONALITY TRAITS ANALYZED BY ARTIFICIAL INTELLIGENCE BASED ON VISUAL AND AUDIO INFORMATION FROM THE INTERVIEW VIDEO. THESE ARE THE RESULTS OF PERSONALITY TRAIT ANALYSIS LIMITED TO THE INTERVIEW VIDEO, WHICH MAY NOT REPRESENT YOUR OWN PERSONALITY TRAITS. THESE ARE PREDICTED VALUES WHEN THE INTERVIEWER JUDGES THE FIVE PERSONALITY TRAITS WITH RESPECT TO INTERVIEW DATA.

FIG. 19
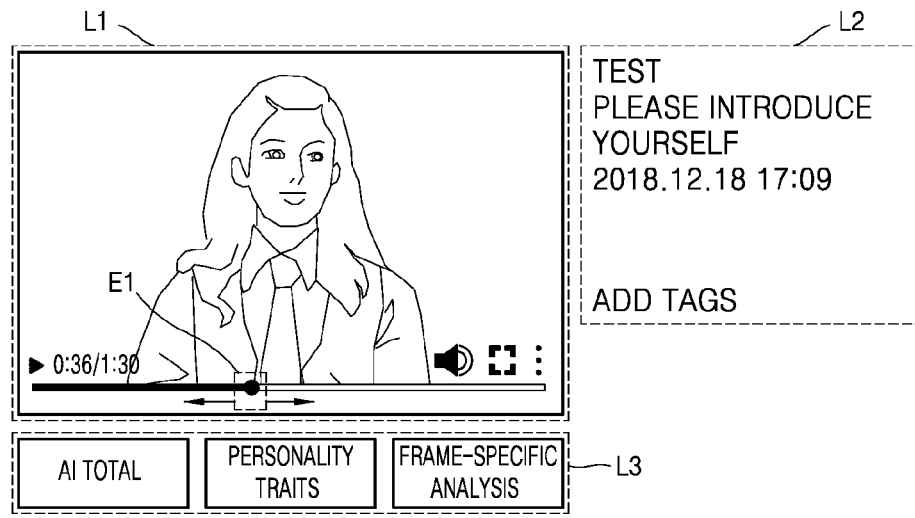
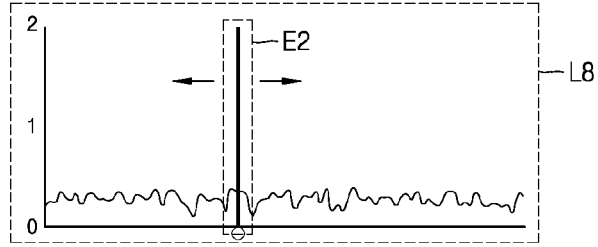
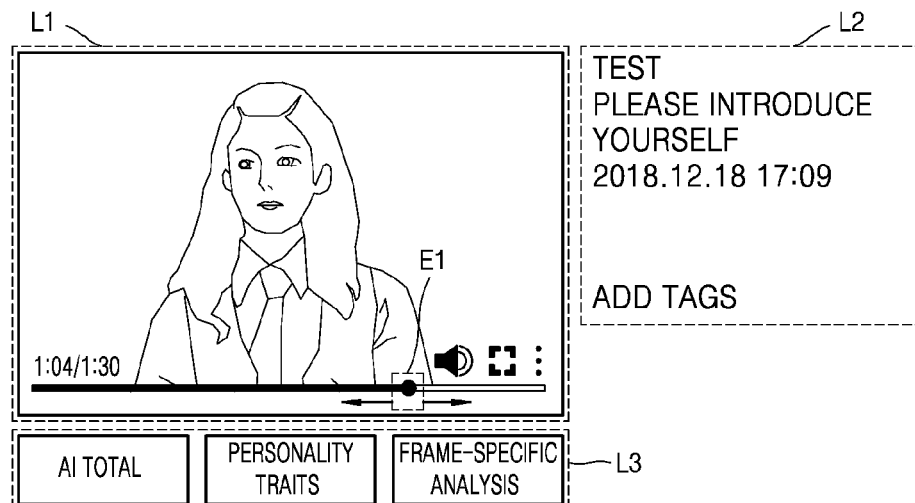
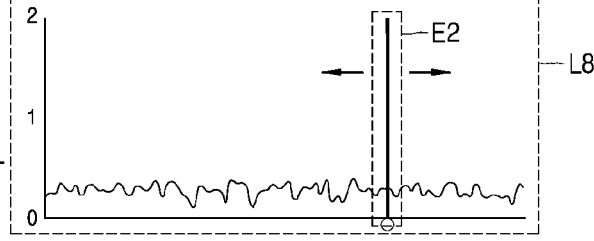

FIG. 21

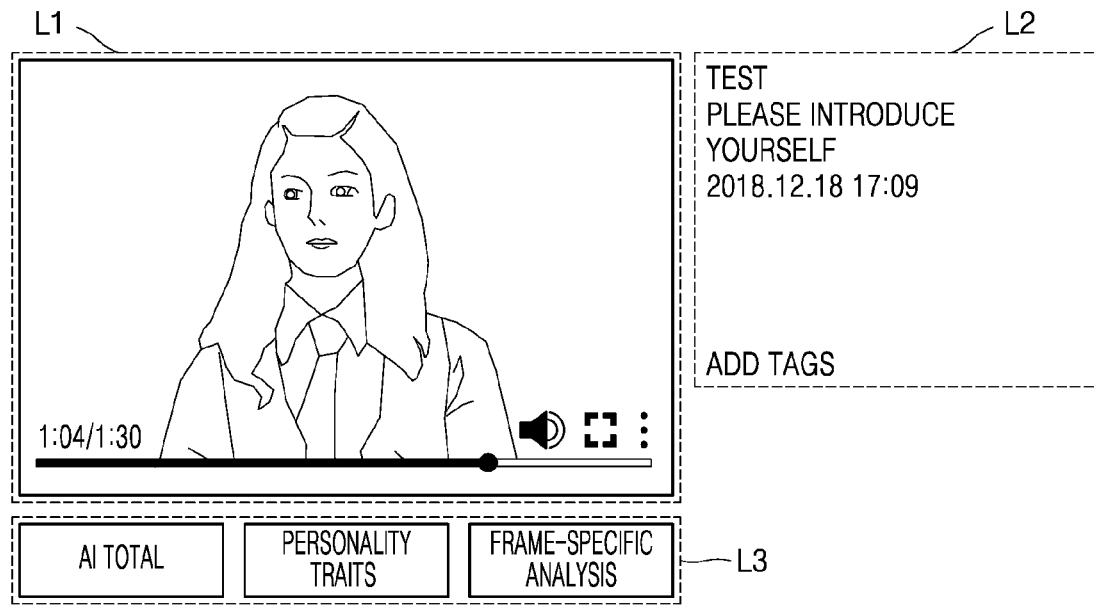

GAZE TREATMENT   *WHEN PLAYING THE VIDEO ABOVE, YOU CAN SEE VALUES FOR EACH FRAME IN CONJUNCTION WITH THE GRAPH BELOW.

HEAD MOVEMENT

VOICE PITCH

VOICE VOLUME

EMOTIONS BASED ON FACIAL EXPRESSION CHANGES

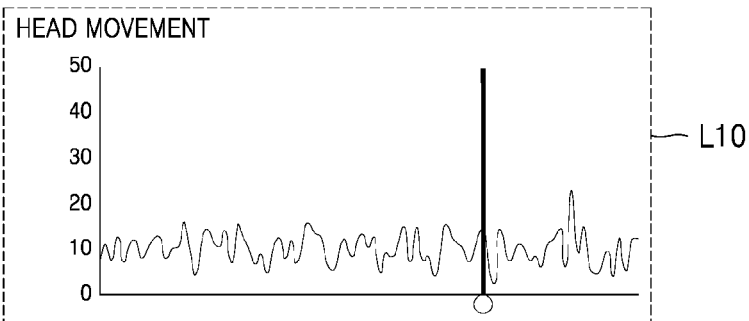

IT IS A GRAPH THAT SHOWS THE CHANGE INFORMATION OF THE HEAD MOVEMENT BY TRACKING THE HEAD POSE DURING THE INTERVIEW VIDEO RECORDING. LIKE THE GAZE TREATMENT, IF THE AMPLITUDE OF THE VALUE IN A CERTAIN SECTION IS LARGE, IT MEANS THAT THE HEAD MOVEMENT IS LARGE AT THAT POINT. AS A WHOLE, FREQUENT HIGH-AMPLITUDE INTERVALS CAN BE SEEN AS BEING DISTRACTED.

FIG. 22
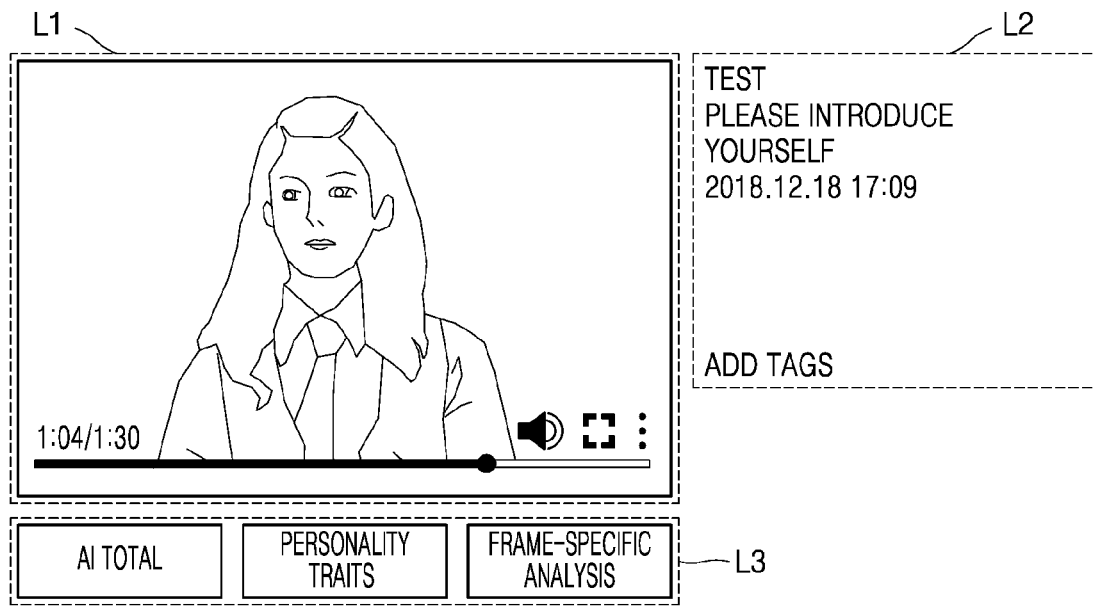
GAZE TREATMENT
HEAD MOVEMENT
VOICE PITCH
VOICE VOLUME
EMOTIONS BASED ON FACIAL EXPRESSION CHANGES
* WHEN PLAYING THE VIDEO ABOVE, YOU CAN SEE VALUES FOR EACH FRAME IN CONJUNCTION WITH THE GRAPH BELOW.
FRAME BY FRAME: EMOTIONS BASED ON FACIAL EXPRESSION CHANGES
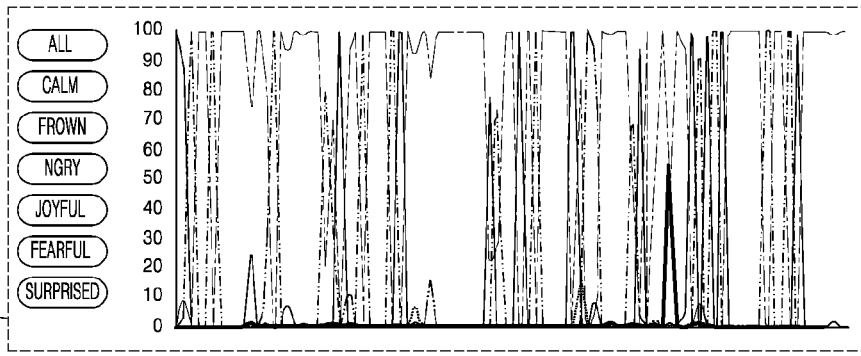
ALL:EMOTIONS BASED ON FACIAL EXPRESSION CHANGES
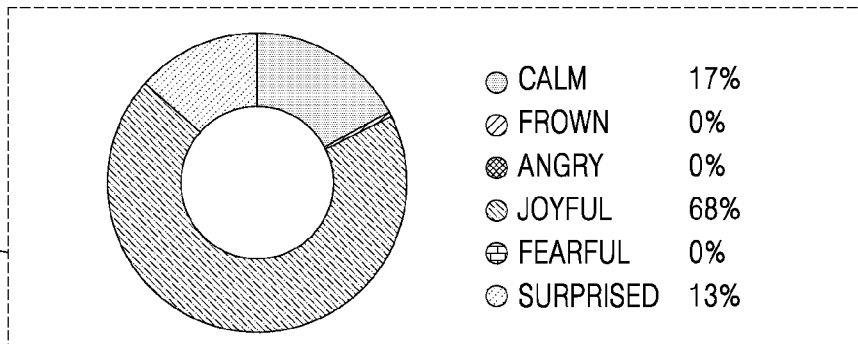

FIG. 24
(A)
(B)

FIG. 25
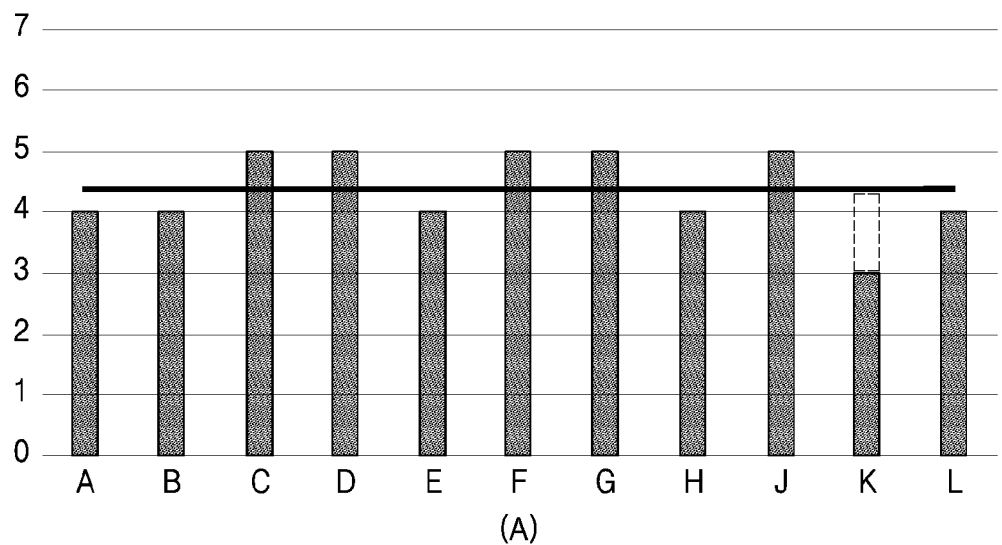
(A)
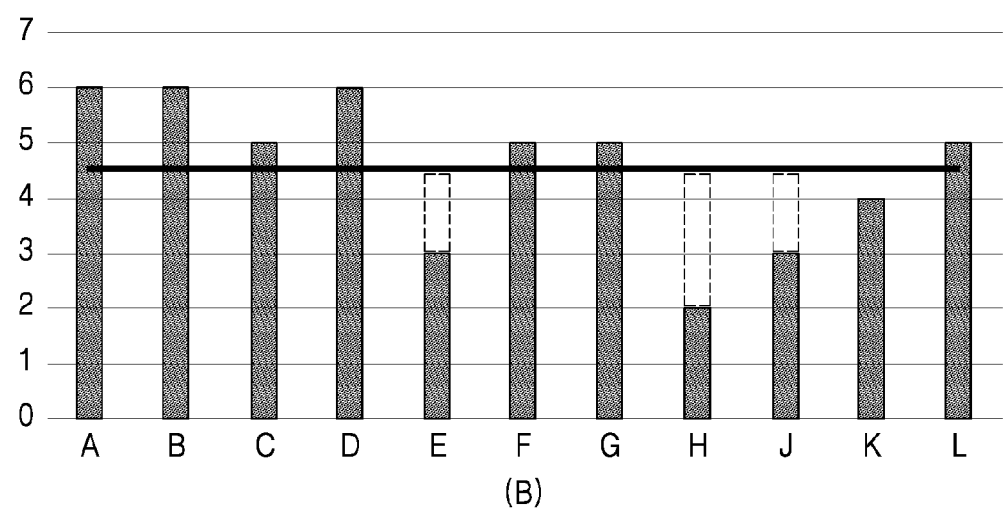
(B)

METHOD AND SYSTEM FOR MANAGING AUTOMATIC EVALUATION MODEL FOR INTERVIEW VIDEO, AND COMPUTER-READABLE MEDIUM

TECHNICAL FIELD

The present invention relates to a method, a system and a computer-readable medium for managing an automatic evaluation model for an interview video, and more particularly, to a method, a system and a computer-readable medium for managing an automatic evaluation model for an interview video, in a server system that conducts an online interview and provides automatic evaluation results for the interview video, so as to provide automatic evaluation results actually matching actual evaluation, recruitment, personnel assessment, and the like of a company, and train an evaluation model while minimizing an influence due to bias of an evaluator who provides training data.

BACKGROUND ART

In general, an interview is composed of an interviewee evaluated through the interview and an interviewer conducting an evaluation on the interviewee, proceeds with questions of the interviewer and answers of the interviewee, and includes a comprehensive evaluation for all of the questions and answers.

The purpose of the interview is to identify, through questions and answers, hard skills such as expertise, special skills, or information application abilities of the interviewee, as well as soft skills such as attitude and communication skills of the interviewee.

Meanwhile, it is difficult to provide objective evaluation results for the soft skills. In particular, the soft skills may be properly evaluated only by an evaluator having various experiences as an interviewer. In particular, it is difficult to accurately evaluate the soft skills when an online interview subject to an interview video is conducted.

In addition, since the soft skills are in an area judged differently according to the interviewer's subjective experience and intuition, evaluation criteria and evaluation schemes may vary depending on each interviewer. Accordingly, due to the evaluation schemes varying according to the subjectivity of the interviewer, it is difficult to objectively evaluate the soft skills of the interviewee.

Meanwhile, it is difficult to individually check all of the soft skills when a company collects interview videos of numerous applicants through online interviews. Further, in the case that automatic evaluation results for applicants' interview videos are drawn and provided through an evaluation model, the results of the evaluation model may not match the actual evaluation on the applicant, may not match a talent image of the applied company, or may not match the actual performance, personnel assessment and the like after hiring.

In addition, the soft skills have various factors and the scheme of providing the results therefor is also very important. It is necessary for a person preparing for the interview to figure out deficient parts of the person in detail as a whole in addition to an evaluation for just being extrovert or introvert. In addition, it is necessary to figure out accurate points having the deficiency during the interview.

DISCLOSURE

Technical Problem

An object of the present invention is to provide a method, a system and a computer-readable medium for managing an automatic evaluation model for an interview video, in a server system that conducts an online interview and provides automatic evaluation results for the interview video, so as to provide automatic evaluation results actually matching the actual evaluation, recruitment, performance assessment, and the like of a company, and train an evaluation model while minimizing an influence due to bias of an evaluator who provides training data.

Technical Solution

In order to solve the above problems, one embodiment of the present invention provides a method for managing an evaluation model, which is performed in a server system having one or more processors and one or more memories, provides automatic evaluation results for an interview video of a subject to be evaluated, and includes: a video evaluation result training step of training an evaluation model for providing automatic evaluation results for an interview video in the server system, according to video evaluation results of evaluators for the video of the interview conducted by the subject to be evaluated during an online interview; and a recruitment evaluation result training step of training the evaluation model for providing automatic evaluation results for the interview video in the server system, according to recruitment evaluation results for an actual recruitment interview of a company applied by the corresponding subject to be evaluated, wherein the evaluation model includes one or more machine-trained detailed evaluation models.

In one embodiment of the present invention, the method for managing the evaluation model may further include a personnel assessment evaluation result training step of training an evaluation model for providing an automatic evaluation result for the interview video of the server system, according to personnel assessment evaluation results on job competency after actual hiring at a company applied by the subject to be evaluated.

In one embodiment of the present invention, the method for managing the evaluation model may further include an evaluation result providing step of providing an automatic evaluation result derived based on the evaluation model to a company to which an applicant in the interview video wants to apply, with respect to a received interview video, and the evaluation model may be provided in the server system according to companies to which the subject wants to apply through the online interview.

In one embodiment of the present invention, the evaluation model may include: a common evaluation model for deriving common feature information on the interview video; a video evaluation result prediction model for deriving an evaluation result related to the video evaluation result, based on the common feature information; and a recruitment evaluation result prediction model for deriving an evaluation result related to the recruitment evaluation result, based on the common feature information, wherein the common evaluation model and the video evaluation result prediction model may be trained by the comprehensive evaluation results of the evaluators, and the common evaluation model and the recruitment evaluation result prediction model may be trained by the employment evaluation results of the evaluators.

In one embodiment of the present invention, the evaluation model may include: a common evaluation model for deriving common feature information on the interview video; a video evaluation result prediction model for deriving an evaluation result related to the video evaluation result, based on the common feature information; a recruitment evaluation result prediction model for deriving an evaluation result related to the recruitment evaluation result, based on the common feature information; and a personnel assessment evaluation result prediction model for deriving evaluation results related to the personnel assessment evaluation result, based on the common feature information, wherein the common evaluation model and the video evaluation result prediction model may be trained by the comprehensive evaluation results of the evaluators, the common evaluation model and the recruitment evaluation result prediction model may be trained by the employment evaluation results of the evaluators, and the common evaluation model and the personnel assessment evaluation result prediction model may be trained by the personnel assessment evaluation results of the evaluators.

In one embodiment of the present invention, the evaluation model may include: a common evaluation model for deriving common feature information on the interview video, wherein the common evaluation model may include: a first deep neural network for extracting spatial feature information for deriving a plurality of video feature information from video information on a plurality of frames of the interview video; a first deep neural network for extracting spatial feature information for deriving a plurality of voice feature information from a plurality of voice information of the interview video; a first recurrent neural network module for receiving the plurality of video feature information to derive first feature information; and a second recurrent neural network module for receiving the plurality of voice feature information and deriving second feature information.

In one embodiment of the present invention, the method for managing the evaluation model may further include an evaluation result providing step of providing an automatic evaluation result derived based on the evaluation model to a company to be applied in the interview video, with respect to the received interview video, wherein the automatic evaluation result may include an evaluation prediction result related to the video evaluation result, and an evaluation prediction result related to the recruitment evaluation result.

In one embodiment of the present invention, the method for managing the evaluation model may further include an evaluation result providing step of providing an automatic evaluation result derived based on the evaluation model to a company to be applied in the interview video, with respect to the received interview video, wherein
    the automatic evaluation result may include a comprehensive evaluation result on the interview video based on evaluation values of one or more detailed evaluation models trained by the video evaluation result and one or more detailed evaluation models trained by the recruitment evaluation result.

In order to solve the above problems, one embodiment of the present invention provides a method for managing an evaluation model, which is performed in a server system having one or more processors and one or more memories, provides automatic evaluation results for an interview video of a subject to be evaluated, and includes: a video evaluation result training step of training an evaluation model for providing automatic evaluation results for an interview video in the server system, according to video evaluation results of evaluators for the video of the interview conducted by the subject to be evaluated during an online interview; and a personnel assessment evaluation result training step of training an evaluation model for providing an automatic evaluation result for the interview video of the server system, according to personnel assessment evaluation results on job competency after actual hiring at a company applied by the subject to be evaluated, wherein the evaluation model includes one or more machine-trained detailed evaluation models.

In order to solve the above problems, one embodiment of the present invention provides a server system for managing an evaluation model that provides automatic evaluation results for an interview video of a subject to be evaluated, and the system includes: a video evaluation result training unit for training the evaluation model that provides the automatic evaluation results on the interview video of the server system, according to video evaluation results of evaluators for the video of the interview conducted by the subject to be evaluated during an online interview; and a recruitment evaluation result training unit for training the evaluation model that provides the automatic evaluation results on the interview video of the server system, according to recruitment evaluation results for an actual recruitment interview of a company applied by the corresponding subject to be evaluated, wherein the evaluation model includes one or more machine-trained detailed evaluation models.

In order to solve the above problems, one embodiment of the present invention provides a computer-readable recording medium configured to record a program for performing a method for managing the above-described evaluation model.

In order to solve the above problems, one embodiment of the present invention provides a method that is performed in a server system having one or more processors and one or more memories, trains the evaluation model that provides automatic evaluation results on the interview video of the subject to be evaluated, and includes: an interview video storage step of transmitting one or more question information among the preset question sets to the user terminal, and receiving and storing the interview video formed by responding to the question information from the user terminal; an evaluation information collection step of collecting evaluation information of a plurality of evaluators with respect to the interview video; a reliability calculation step of calculating reliability information on the evaluators from the evaluation information of the evaluators; and an evaluation model training step of training the evaluation model by using the calculated reliability information and the evaluation information.

In one embodiment of the present invention, the method for training the evaluation model may include an evaluation result providing step of providing the automatic evaluation result based on the evaluation model for the interview video to the user terminal of the organization to which a person who records the interview video wants to apply, wherein the server system may include evaluation models according to applied organizations, respectively, and the evaluation model in the evaluation model training step may be trained by the evaluation information of the evaluator corresponding to the applied organization.

In one embodiment of the present invention, the evaluation information may include evaluation scores inputted by a plurality of evaluators, respectively, with respect to a plurality of evaluation items of the evaluators for the corresponding interview video.

In one embodiment of the present invention, the reliability information may include a reliability score for each evaluation item by each evaluator.

According to one embodiment of the present invention, in the reliability calculation step, the reliability score may be calculated as lower when a difference from the average evaluation scores of a plurality of evaluators for a specific evaluation item with respect to the video is greater.

In one embodiment of the present invention, the reliability calculation step may include: a first step of deriving the estimated score by applying the reliability scores for the evaluators and the evaluation scores for the evaluators to a specific evaluation item; a second step of updating the evaluator-specific reliability score, based on the calculated estimated score and the evaluator-specific evaluation score; a third step of determining whether the estimated scores converge within a preset range, based on the estimated score currently derived in the first step and one or more estimated scores derived previously, wherein, when it is determined in the third step that the estimated score converges within the preset range, the calculated evaluator-specific reliability score may be calculated as reliability information, and when it is determined in the third step that the estimated score does not converge within the preset range, the first step, the second step, and the third step may be repeated.

In one embodiment of the present invention, the evaluation model training step may derive a comprehensive evaluation score by reflecting the evaluator-specific reliability score included in the reliability information, as a weight, to a plurality of evaluation scores of a plurality of evaluators with respect to the corresponding evaluation item, and may train the evaluation model with respect to the corresponding evaluation item, based on the derived comprehensive evaluation score and the corresponding interview video.

In order to solve the above problems, one embodiment of the present invention provides a server system that performs a method for managing an evaluation model for providing automatic evaluation results for an interview video of a subject to be evaluated, and includes: an interview video storage unit for transmitting one or more question information among the preset question sets to the user terminal, and receiving and storing the interview video formed by responding to the question information from the user terminal; an interview video evaluation unit for generating automatic evaluation information on the interview video through an evaluation model using machine training; an evaluation information collection unit for collecting evaluation information on a plurality of evaluators for the corresponding interview video; a reliability calculation unit for calculating reliability information for the evaluators from the evaluation information of the evaluators; and an evaluation model training unit for training the evaluation model by using the calculated reliability information and the evaluation information.

One embodiment of the present invention provides a computer-readable recording medium configured to record a program for performing a method for training the above-described evaluation model.

Advantageous Effects

The present invention can provide a method, a system and a computer-readable medium for managing an automatic evaluation model for an interview video, in a server system that conducts an online interview and provides automatic evaluation results for interview video, so as to provide automatic evaluation results actually matching the actual evaluation, recruitment, and performance review of a company, and train an evaluation model while minimizing an influence due to bias of an evaluator providing training data.

DESCRIPTION OF DRAWINGS

FIG. 4 schematically shows a screen in a terminal of a subject to be evaluated according to operations of the interview video storage unit according to one embodiment of the present invention.

FIG. 16 schematically shows a display screen in a user terminal according to the execution of a question set setting unit according to one embodiment of the present invention.

FIG. 17 schematically shows a display screen in the user terminal according to execution of a comprehensive evaluation providing unit of an evaluation result providing unit according to one embodiment of the present invention.

FIG. 18 schematically shows a display screen in the user terminal according to execution of the personality trait providing unit of the evaluation result providing unit according to one embodiment of the present invention.

FIG. 19 schematically shows a display screen in the user terminal according to execution of the frame-specific analysis providing unit of the evaluation result providing unit according to one embodiment of the present invention.

FIG. 21 schematically shows a display screen in the user terminal according to execution of the head movement result provision of the frame-specific analysis providing unit of the evaluation result providing unit according to one embodiment of the present invention.

FIG. 22 schematically shows a display screen in the user terminal according to execution of the emotion result provision by the frame-specific analysis providing unit of the evaluation result providing unit according to one embodiment of the present invention.

FIG. 24 schematically shows a data format of the evaluation information of the evaluator received by the evaluation information collection unit according to some embodiments of the present invention.

FIG. 25 shows an example of evaluation information data of a plurality of evaluators according to the present invention.

BEST MODE

Figure 1:
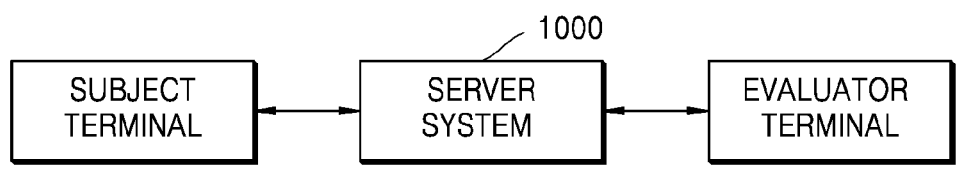
FIG. 1 schematically shows an overall system form of the method for managing an automatic evaluation model for an interview video according to one embodiment of the present invention.

Hereinafter, embodiments of the present invention will be described in detail with reference to the accompanying drawings so that the embodiments may be easily carried out by those having ordinary skill in the art. However, the invention may be embodied in various different forms and is not limited to the embodiments described herein. In addition, parts irrelevant to the description are omitted in the drawings to clearly describe the present invention, and like reference numerals designate like parts throughout the specification.

Throughout the specification, when one part is "connected" to other part(s), the above expression includes not only "directly connected" but also "electrically connected" in which another element is interposed therebetween. In addition, when one part "includes" a certain element, the above expression does not exclude other elements, but may further include the other elements unless particularly stated otherwise.

Further, the terms including an ordinal number such as first and second may be used to describe various elements, however, the elements are not limited by the terms. The terms are used only for the purpose of distinguishing one element from another element. For example, the first element may be referred to as the second element without departing from the scope of the present invention, and similarly, the second element may also be referred to as the first element. The term "and/or" includes any one of a plurality of related listed items or a combination thereof.

In the specification, the term 'unit' includes a unit realized by hardware, a unit realized by software, and a unit realized using the both thereof. In addition, one unit may be implemented using at least two pieces of hardware, and at least two units may be implemented by one piece of hardware.

Meanwhile, "~unit" may not be limited to software or hardware, may be configured to present in an addressable storage medium, and may be configured to reproduce at least one processor. Accordingly, as an example, the '~unit' includes software components, object-oriented software components, components such as class components and task components, processes, functions, attributes, procedures, subroutines, segments of program code, drivers, firmware, microcode, circuits, data, databases, data structures, tables, arrays and variables. The functionality provided within the components and the '~unit's may be combined into a smaller number of components and ' unit's or further separated into additional components and the '~unit's. In addition, the components and '~unit's may be implemented to reproduce at least one CPU in a device or a secure multimedia card.

The "user terminal" referred to below may be implemented as a computer or portable terminal that can access a server or other terminals through a network. The computer may include, for example, notebook computers, desktops, laptops, and the like installed with a web browser, and the portable terminal refers to a wireless communication device that guarantees, for example, portability and mobility, and may include all kinds of handheld-based wireless communication devices such as personal communication system (PCS), global system for mobile communications (GSM), personal digital cellular (PDC), personal handyphone system (PHS), personal digital assistant (PDA), international mobile telecommunication (IMT)-2000, code division multiple access (CDMA)-2000, W-code division multiple access (W-CDMA), and wireless broadband Internet (Wibro) terminals. In addition, "network" may be implemented by a wired network such as a local area network (LAN), a wide area network (WAN) or a value added network (VAN), and all types of wireless network such as a mobile radio communication network, or a satellite network.

Method, System and Computer-Readable Medium for Managing Automatic Evaluation Model for Interview Video FIG. 1 schematically shows an overall form of a server system 1000 according to a method of performing an online interview or managing an automatic interview video evaluation model according to one embodiment of the present invention.

In the server system 1000 shown in FIG. 1, an interview video may be received in an automated way from a terminal of a subject to be evaluated, and an automatic evaluation result on soft skills or the like through a machine-trained evaluation model for the interview video may be provided to a connected member, applied organization (company), and evaluator terminal. According to a preferred embodiment of the present invention, the server system 1000 may be used to conduct an actual online interview, the subject terminal may correspond to a terminal of a user who wants to apply to a corresponding company, and the evaluator terminal may correspond to a terminal for providing an evaluation result on the interview video provided by the subject terminal, or an evaluation result on an applicant in the interview video.

In other words, the server system 1000 shown in FIG. 1 may also be used as a system for conducting an actual online interview for a specific organization of the applicant. In the above case, the interview result on the interview video or the like received from the subject terminal may be transmitted to the terminal of the organization.

In addition, the server system 1000 shown in FIG. 1 may be used in the form of accessing the evaluator terminal to input evaluation information. In the above case, an evaluation model training unit 1600 of the server system 1000 may train and improve an automatic evaluation model based on evaluation information inputted from the evaluator terminal and the like.

Accordingly, the server system 1000 shown in FIG. 1 may receive the interview video from the subject terminal, and may transmit automatic evaluation information on the received interview video to one or more of the organization terminal, the evaluator terminal, and the subject terminal. Simultaneously, the server system 1000 may perform complex functions of training or improving the evaluation model of the server system 1000 through the evaluation result received from the evaluator terminal and the like.

Hereinafter, the server system 1000 of the present invention will be described with focusing on a method of using the server system 1000 for the actual online interview, and improving and managing, afterwards, the automatic evaluation model by various training data.

The subject terminal and the evaluator terminal in FIG. 1 may correspond to the above-described user terminal, and the server system 1000 corresponds to a computing device including at least one processor and at least one memory.

The evaluator terminal may correspond to a terminal used by a person in charge of a hiring side, that is, a company side in the online interview, or a terminal that transmits the interview video or evaluation result on the applicant to the server system 1000.

The subject terminal or the evaluator terminal may access to the server system 1000 through a web browser program, or may access the server system 1000 through a dedicated application.

The subject terminal or the evaluator terminal may log in to the server system 1000 through an account of each user to use services of the server system 1000.

The subject terminal or the evaluator terminal may log in to the server system 1000 through a different type of account, for example, an applicant (subject to be evaluated) type account, an evaluator type account, and an organization (such as a company that conducts recruitment) type account.

Figure 2:
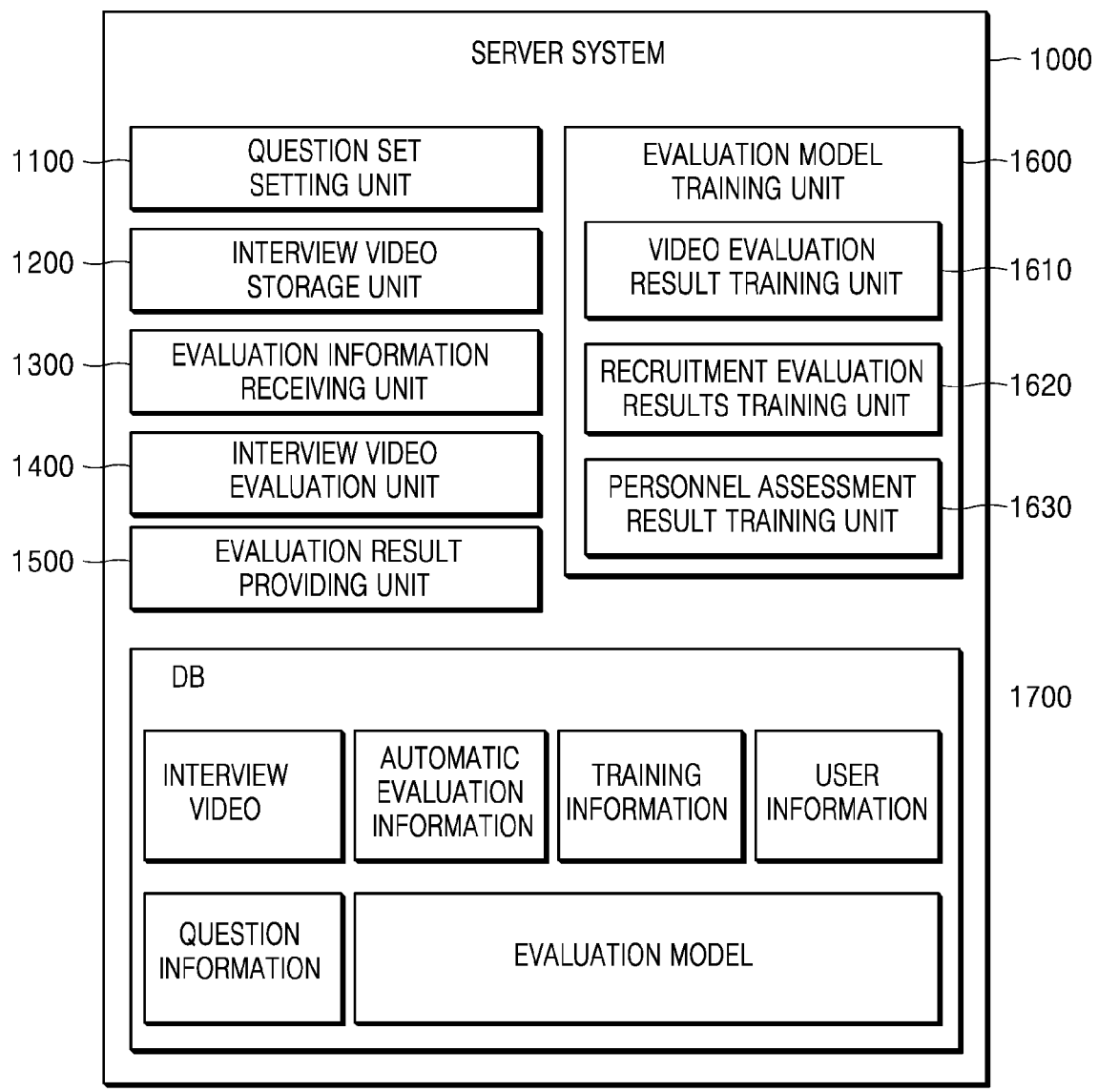
FIG. 2 schematically shows an internal configuration of a server system according to one embodiment of the present invention.

FIG. 2 schematically shows an internal configuration of the server system 1000 according to one embodiment of the present invention.

The server system 1000 of the present invention may also be used as a system for conducting online interviews with actual companies. Specifically, the applicant may transmit the interview video to the server system 1000 through the subject terminal, and the server system 1000 may provide the received interview video, automated evaluation information and/or the like to the terminal of the organization (evaluator terminal).

At the same time, the server system 1000 of the present invention may perform operations for further improving an evaluation model that automatically generates evaluation information.

Meanwhile, the server system 1000 of the present invention may be implemented in the form of physically including a plurality of servers rather than a single server. For example, the evaluation model training unit 1600 may be configured as a separate physical server. In addition, the evaluation model included in a DB may be implemented as a separate server.

A question set setting unit 1100 sets up a question set for question content reproduced in the subject terminal in order to receive the interview video.

Preferably, information about the organization to which the subject to be evaluated wants to apply may be inputted, and the question set setting unit 1100 may determine the question set according to question information set by the corresponding organization.

Question contents to be conducted by companies in online interviews are stored in the server system 1000 with respect to each company conducting each online interview, and the above question contents may be implemented as one or more of text, video, and audio.

In other words, when the server system 1000 performs an actual online interview, the question set setting unit 1100 generates a question set based on a question list for a company to which the applicant wants to apply.

Thereafter, the interview video storage unit 1200 may sequentially or randomly extract questions from the question set and transmit the extracted questions to the subject terminal, and the user may figure out the questions through the subject terminal, and then transmit response videos for the questions to the server system. 1000.

The interview video storage unit 1200 may transmit one or more question information or question contents to the subject terminal, and receive and store the interview videos formed by responding to the question information from the subject terminal.

The question information may be implemented in the form of one or more of question text, question voice, and question video.

Specifically, the subject terminal is provided with an interface for displaying or reproducing questions according to the question information, and an interview video taken by a camera and a microphone equipped in the user terminal is transmitted from the subject terminal to the server system 1000, and stored in the DB together with identification information for the interview video.

The evaluation information receiving unit 1300 may receive an evaluation result related to conducting the online interview, or an evaluation result on the video interview for training the evaluation model or on the applicant. The evaluation information receiving unit 1300 may receive the evaluation result from the evaluator terminal shown in FIG. 1 or may receive the evaluation result by an administrator of the server system 1000.

The interview video evaluation unit 1400 may generate automatic evaluation information on the interview video through an evaluation model using machine training. Preferably, the evaluation model may include one or more detailed evaluation models based on machine training, and more preferably, may include one or more detailed evaluation models based on deep learning.

In other words, the server system 1000 may receive the interview video and then automatically perform the evaluation using the evaluation model, thereby generating automatic evaluation information. The automatic evaluation information may include one or more of: a video evaluation result related to the interview including one or more of favorable impression, concentration, trustworthiness, liveliness, composure, communication ability, eye contact, kindness, use of habits, and pleasantness; a recruitment evaluation result including one or more of application motive, challenging spirit, professionalism, cooperation, and company talent matching information that are judged when the applicant undergoes an actual recruitment evaluation of the company; and a personnel assessment evaluation result including one or more of work diligence, management competency, job competency, and comprehensive personnel assessment grade that are judged when the applicant is actually hired by the applied company and then undergoes personnel assessment evaluation. More preferably, the automatic evaluation information may include a comprehensive evaluation result calculated by considering two or more of the video evaluation result, the recruitment evaluation result, and the personnel assessment evaluation result.

The video evaluation result may include at least one quantitative information on a personality trait including one or more of openness, conscientiousness, extraversion, affinity, and neuroticism; and an attitude feature including one or more of gaze treatment, head movement, voice pitch, voice pitch, voice volume, and emotion.

Preferably, the evaluation model may include one or more deep learning-based trained artificial neural network modules. The evaluation model may further include a detailed evaluation model based on preset rules in addition to the trained artificial neural network modules. In other words, according to one embodiment of the present invention, the evaluation model may correspond to a form using the trained artificial neural network module and the rule-based detailed evaluation model in combination.

The evaluation result providing unit 1500 provides the automatic evaluation result to the user terminal based on the automatic evaluation information. Specifically, the evaluation result providing unit 1500 may transmit the automatic evaluation information and data having a format processed with the automatic evaluation information (data related to the implementation of the interface in which the automatic evaluation information is reflected) to the user terminal (for example, the terminal of the company's personnel team), and various configured evaluation information is displayed in a web browser and dedicated application of the user terminal according to the user's selection.

The basic operation of the server system 1000 is configured to relieve a burden on the evaluator side for ascertaining the video upon conducting the online interview, by deriving the automatic evaluation information on the interview video received from the subject terminal.

Meanwhile, according to one embodiment of the present invention, the server system 1000 may also be used to train the evaluation model. The above function is performed by the evaluation model training unit 1600. In other words, the evaluation model training unit 1600 may perform a method of training the evaluation model that provides automatic evaluation results on the interview video of the subject to be evaluated.

The evaluation model training unit 1600 includes one or more of: a video evaluation result training unit 1610 for training the evaluation model that provides the automatic evaluation results on the interview video of the server system 1000, according to video evaluation results of evaluators for the video of the interview conducted by the subject to be evaluated during an online interview; a recruitment evaluation result training unit 1620 for training the evaluation model that provides the automatic evaluation results on the interview video of the server system 1000, according to recruitment evaluation results for an actual recruitment interview of a company applied by the corresponding subject to be evaluated; and a personnel assessment evaluation result training unit 1630 for training the evaluation model that provides the automatic evaluation results on the interview video of the server system 1000, according to personnel assessment evaluation results on job competency after actual hiring at a company applied by the subject to be evaluated.

Preferably, the evaluation model training unit 1600 basically includes the video evaluation result training unit 1610, and includes one or more of the recruitment evaluation result training unit 1620 and the personnel assessment evaluation result training unit 1630.

The evaluation model training unit 1600 may train the evaluation model using machine training based on the evaluation information of the evaluator. According to one embodiment of the present invention, the server system 1000 may transmit the interview video to the evaluator terminal, and may receive an evaluation on the above video from the evaluator terminal. The evaluation results received from the evaluator terminal may be used in the online interview, so as to be used as an evaluation factor upon recruiting the applicant of the corresponding interview video, and simultaneously, used to train the evaluation model that outputs the automatic evaluation result of the server system 1000.

Due to the operations of the evaluation model training unit 1600 as described above, the server system 1000 can automatically and continuously improve the performance of the evaluation model while performing the online interview.

Meanwhile, the interview video received from the subject terminal, the automatic evaluation information performed by the interview video evaluation unit 1400 with respect to the interview video; the evaluation information received from the evaluation information receiving unit 1300 (evaluation information on the video, information on a recruitment result of the corresponding applicant, and information on personnel assessment evaluation after actual hiring of the applicant), the user information of the subject or the evaluator, the question information on the questions required to be answered in the interview video, and the evaluation model used by the interview video evaluation unit 1400 to evaluate the interview video and additionally trained by the evaluation model training unit 1600 may be stored in the DB 1600 of the server system 1000.

The server system 1000 shown in FIG. 2 may further include other components in addition to the shown components, however, only the components related to performing the online interview and training the evaluation model according to the embodiments of the present invention have been indicated for convenience.

Figure 3:
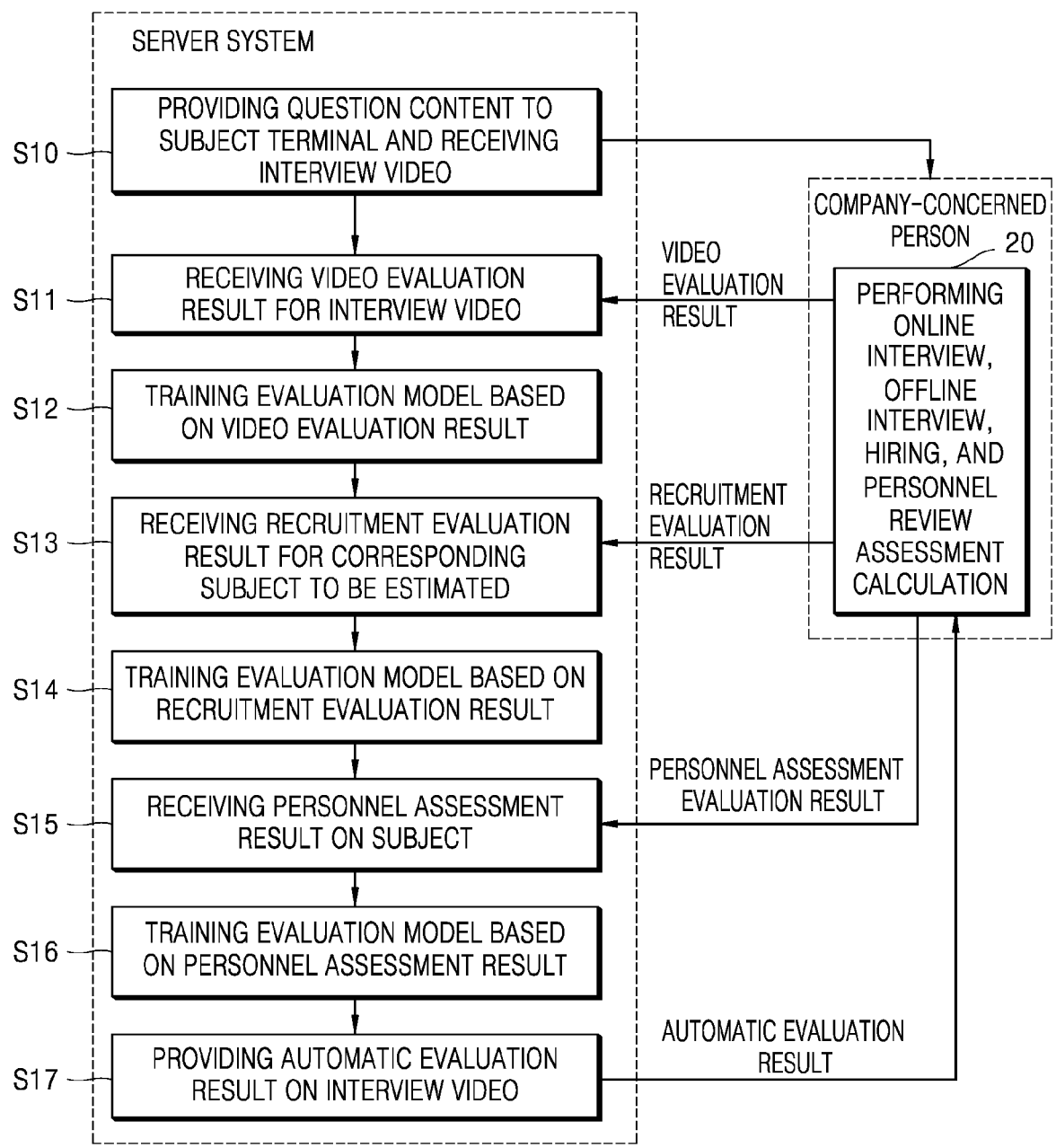
FIG. 3 schematically shows steps to train the evaluation model according to one embodiment of the present invention.

FIG. 3 schematically shows steps to train the evaluation model according to one embodiment of the present invention.

The method for an automatic evaluation result for an interview video of a subject to be evaluated according to one embodiment of the present invention is performed in a server system 1000 having one or more processors and one or more memories.

In step S10, question content is provided to a subject terminal, and an interview video is received from the subject terminal.

In step S11, a video evaluation result for the interview video is received from an evaluator terminal or the like. Preferably, the video evaluation result may correspond to an evaluation performed on the interview video by related persons of a personnel team of a company to which an applicant wants to apply or recruiting managers related to the company. Alternatively, the above video evaluation result may be provided by the side who provides services of the server system 1000, however, may be preferably conducted by the related persons of the company who knows the company's recruitment standards and the like in order to hire human resources that satisfy the preferred talent image of the company, and train the evaluation model based on the video evaluation result.

In step S11, a video evaluation result training step of training the evaluation model that provides the automatic evaluation results on the interview video of the server system 1000, according to video evaluation results of evaluators for the video of the interview conducted by the subject to be evaluated during an online interview, is performed. Accordingly, the recruiting judgement criteria of the company or the evaluator who conducts the online interview of the company or may be reflected in the evaluation model.

Meanwhile, in step S20, the actual online interview may be conducted in consideration of the video evaluation results, and an actual offline interview may be conducted after the online interview. The company may perform the evaluation through the actual interview on the applicant of the interview video. In step S13, the recruitment evaluation result on the applicant of the interview video may be received from a terminal of a person in charge related to the company's system or the company's recruitment. Alternatively, step S13 may be performed in a manner that a service administrator of the server system 1000 inputs the recruitment evaluation result transferred from the person in charge of the company.

Preferably, the above recruitment evaluation result may correspond to the evaluation result by the company in a state in which the evaluation on the corresponding applicant is substantially completed. The recruitment evaluation result may partially include the evaluation on the interview video, however, may substantially correspond to an index for one or more items judged by the company upon deciding whether to finally hire the applicant.

In other words, the recruitment evaluation result corresponds to the evaluation result for deciding whether the company actually hires the applicant, in which the evaluation result may or may not include the evaluation on the interview video.

In step S14, a recruitment evaluation result training step of training the evaluation model that provides the automatic evaluation results on the interview video of the server system 1000, according to recruitment evaluation results for an actual recruitment interview of a company applied by the corresponding subject to be evaluated, is performed.

Through the above training steps, the judgment of the person in charge of the personnel team actually conducting the recruitment of the company and the judgment on the applicant's competency in actual offline are reflected in the evaluation model in addition to the judgment of the evaluator conducting the online interview. Through the processes described above, the evaluation model may learn a correlation between the interview video and the actual interview result, so that the actual interview result may be predictable from the interview video, and simultaneously, the video evaluation result may be predicted more accurately.

Thereafter, in step S20, the hiring company may calculate personnel assessment of the applicant after the applicant is hired, for example, after one or two years pass. Thereafter, in step S15, the personnel assessment evaluation result on the corresponding subject to be evaluated is received. Likewise, in step S15, the recruitment evaluation result on the applicant of the interview video may be received from a terminal of a person in charge related to the company's system or the company's personnel assessment evaluation. Alternatively, step S15 may be performed in a manner that a service administrator of the server system 1000 inputs the recruitment evaluation result transferred from the person in charge of the company.

In step S16, a personnel assessment evaluation result training step of train the evaluation model that provides the automatic evaluation results on the interview video of the server system 1000, according to personnel assessment evaluation results on job competency after actual hiring at a company applied by the subject to be evaluated, is performed.

Through the above training steps, the actual judgment on the competency after actual hiring of the applicant of the corresponding video is reflected in the evaluation model, in addition to the judgment of the evaluator conducting the online interview, the judgment of the person in charge of the personnel team actually conducting the recruitment of the company and the judgment on the applicant's competency in actual offline. Through the processes described above, the evaluation model may learn a correlation between the interview video and the job competency at the time of actual work, the job competency at the time of actual work may be predictable from the interview video, and simultaneously, the video evaluation result may be predicted more accurately.

Thereafter, in step S17, the automatic evaluation result on the interview video is outputted by the evaluation model trained through the above process, and provided to the company. Through the above steps S11 to S16, the evaluation model may determine more accurately to select the human resources who are actually preferred by the company.

In particular, through step S13, the evaluation model may derive a final recruitment evaluation result with high accuracy through offline interview or the like on the actual applicant only by using the interview video. In addition, through step S15, the evaluation model may derive, with high accuracy, the job competency, output and the like of the actual applicant during working at the company only by using the interview video. In addition, through steps S13 and S15, the accuracy of the evaluation model for deriving the video evaluation result according to step S12 can be increased to match the actual state.

FIG. 4 schematically shows a display screen in the user terminal according to execution of the interview video storage unit 1200 according to one embodiment of the present invention.

In one embodiment of the present invention, the interview video storage unit 1200 transmits questions included in a question set for a company to which the user wants to apply to the subject terminal according to the user's input, the subject terminal reproduces content for the question, performs processes of FIGS. 4(A) and 4(B), and then transmits the taken interview video to the server system 1000, and thereafter, the server system 1000 stores the received interview video.

In FIG. 4(A), a display element for counting down is displayed in a currently recorded video while the question is displayed. Specifically, '7' in FIG. 4(A) is an indication for informing to the user that a video record will be in progress after 7 seconds.

FIG. 4(B) shows a screen of the video record in progress after the screen of FIG. 4(A) is finished. In FIG. 4(B), the user answers the question of the previous screen, and the subject terminal records the video on the answering and transmits the record to the server system 1000.

Figure 5:
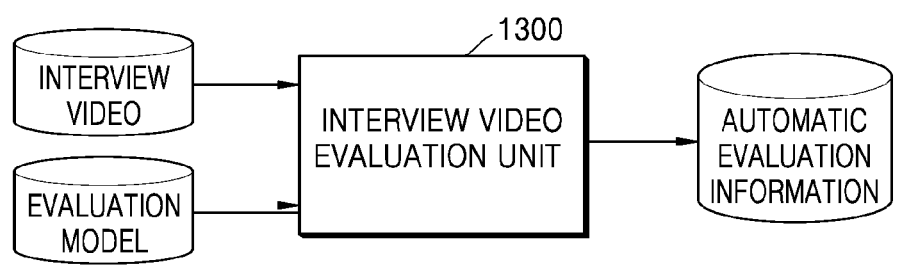
FIG. 5 schematically shows operations of the interview video evaluation unit according to one embodiment of the present invention.

FIG. 5 schematically shows operations of the interview video evaluation unit 1400 according to one embodiment of the present invention.

The interview video evaluation unit 1400 analyzes the interview video by using the trained evaluation model.

The evaluation model may include various detailed evaluation models for evaluating the interview video. The detailed evaluation model may correspond to a detailed evaluation model that may perform evaluation based on the trained deep learning-based evaluation model, or correspond to a detailed evaluation model that derives feature information (such as a position of gaze) based on a preset routine or algorithm rather than training and evaluates the derived feature information.

According to one embodiment of the present invention, the interview video evaluation unit 1400 basically may receive an interview video containing video information and audio information and derive automatic evaluation information through an evaluation model trained through machine training technology such as deep learning.

In addition, additionally, the interview video evaluation unit 1400 may analyze the video according to preset rules rather than machine training and derive specific evaluation values.

The detailed evaluation model may extract audio and video information from the interview video, which is a moving image and individually input the extracted audio and video information to the detailed evaluation model to derive result values, or integrate and input the audio and video information to the detailed evaluation model so as to derive the result values.

Preferably, the detailed evaluation model according to one embodiment of the present invention may include a module that infers a speaking state through the shape of the mouth and evaluates the subject of the interview video by considering the speaking state. Specifically, a specific detailed evaluation model includes a module that separately detects a mouth-shaped part of a face included in the interview video, and determines whether the face is speaking or not by using artificial neural network technology including a temporal concept such as RNN, LSTM, and GRU, and the model may be configured to, based on the above information, automatically adjust an accurate weight affecting on the evaluation with respect to the video information and the audio information, and configured to be trained about the weight as well.

In other words, according to the above configuration, when it is determined through the mouth shape in the interview video that the subject to be evaluated or the speaker is not speaking, the video information may be automatically processed more importantly (a relatively higher weight is applied compared to a normal state), and the voice information may be processed less importantly (a relatively lower weight is applied compared to the normal state).

Preferably, the evaluation model may include a module for extracting a plurality of position information of the user's gaze from a plurality of frames of the interview video, and accordingly, the evaluation result providing unit 1500 and 1400 may provide information on the positional status of the gaze and the moving status of the gaze in the subject terminal.

Preferably, the detailed evaluation model may include a module for extracting head movements of the user from the frames of the interview video, and accordingly, the evaluation result providing unit 1500 may provide information on the head movement in the subject terminal.

Preferably, the detailed evaluation model may include a module for extracting sound characteristic values of voices such as voice pitch and voice volume in the frames, and accordingly, the evaluation result providing unit 1500 may provide information on the voice from the subject terminal.

Preferably, the detailed evaluation model may include a module for extracting a level of emotional factors for each section of the interview video, and accordingly, the evaluation result providing unit 1500 and 1400 may provide information on the emotion from the subject terminal. In the above case, the detailed evaluation model by an artificial neural network trained by the deep learning may be used.

The above-mentioned evaluation model may include one or more detailed evaluation models, in which a part of the detailed evaluation model may be a detailed evaluation model based on rules. However, preferably, the evaluation model may include one or more machine-trained detailed evaluation models. According to one embodiment of the present invention, training the evaluation model signifies training the detailed evaluation model.

Figure 6:
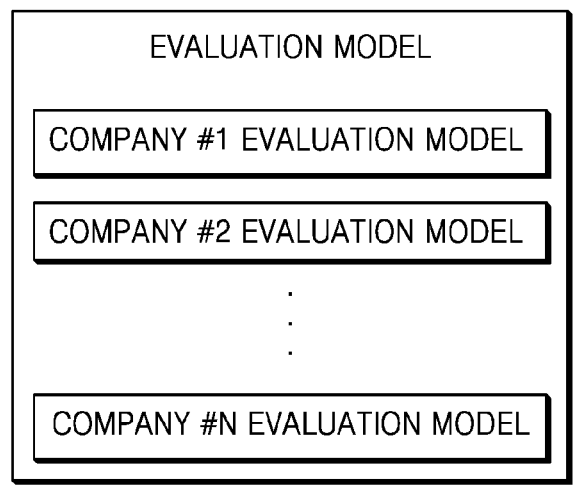
FIG. 6 schematically shows internal models constituting the evaluation model according to one embodiment of the present invention.

FIG. 6 schematically shows evaluation models established in the server system 1000 according to one embodiment of the present invention.

As described above, the server system 1000 for performing the method for managing the evaluation model includes: an evaluation result providing unit 1500 that provides an automatic evaluation result derived based on the evaluation model to a company to be applied in the interview video with respect to the received interview video.

Preferably, the evaluation model is provided in the server system 1000 according to each company to which the subject wants to apply for the online interview.

In the above manner, standards of human resources desired by companies are established in the server system 1000 through evaluation models, respectively, and the evaluation models are trained according to the evaluation results of the companies, respectively. For example, when it is assumed that companies A and B use the server system 1000, and each evaluation model of company A and company B may be established in the server system 1000. When the evaluation model of company A is trained, the evaluation model of company A may be trained to output evaluation results that are significantly similar to the evaluation results by the personnel team of company A, by training the evaluation model of company A to reflect video evaluation results, recruitment evaluation results, and personnel assessment evaluation results derived by related persons of company A with respect to interview videos of applicants who applies to company A.

In the above manner, the evaluation model may predict the actual job competency in the company that cannot be predicted by the personnel team of the corresponding company just through the interview video.

Figure 7:
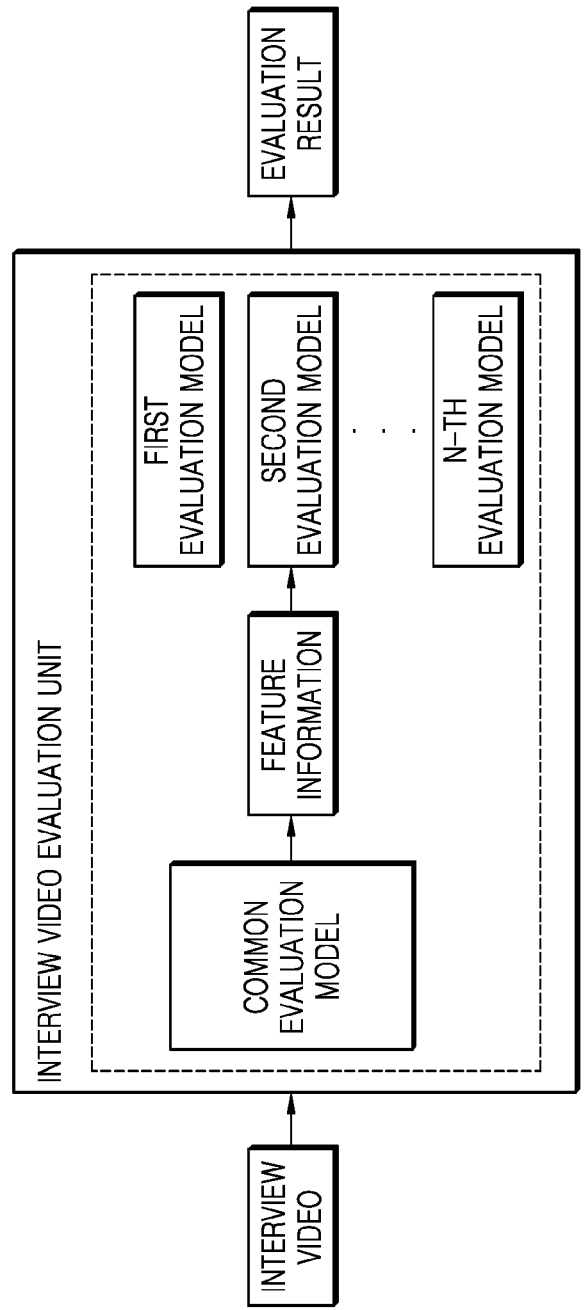
FIG. 7 schematically shows an internal structure of the evaluation model according to one embodiment of the present invention.

FIG. 7 schematically shows an internal structure of the evaluation model according to one embodiment of the present invention.

The evaluation model may include a plurality of detailed evaluation models or evaluation modules. The detailed evaluation model (such as common model and first evaluation model) shown in FIG. 8 corresponds to the machine training-based evaluation module.

The evaluation model according to the embodiments of the present invention may further include detailed evaluation models for performing evaluation based on rules in addition to the detailed evaluation model shown in FIG. 7. However, hereinafter, the evaluation model will be described based on the detailed evaluation model related to training. Preferably, the evaluation model shown in FIG. 7 corresponds to an evaluation model for a specific company.

The evaluation model includes: a common evaluation model for deriving common feature information on the interview video; and a first evaluation model, a second evaluation model, and the like for deriving detailed evaluation results based on the common feature information.

Preferably, the first evaluation model, the second evaluation model and the like include: a video evaluation result prediction model for deriving evaluation results related to the video evaluation result, based on the common feature information; a recruitment evaluation result prediction model for deriving evaluation results related to the recruitment evaluation result, based on the common feature information; and a personnel assessment evaluation result prediction model for deriving evaluation results related to the personnel assessment evaluation result, based on the common feature information.

In other words, the video evaluation result prediction model, the recruitment evaluation result prediction model, and the personnel assessment evaluation result prediction model may derive the evaluation results, based on the feature information derived from the interview video in the common evaluation model.

In the above manner, the common evaluation model may be commonly trained from the video evaluation result, the recruitment evaluation result, and the personnel assessment evaluation result. In other words, when models for deriving the video evaluation result, the recruitment evaluation result, and the personnel assessment evaluation result are established in an independent manner, the correlation between the evaluation results or strong training of the common evaluation model is not implemented. However, the correlation between the evaluation results or strong training of the common evaluation model may be implemented through the common evaluation model as shown in FIG. 7.

For example, in the evaluation model as shown in FIG. 7, the evaluation on the applicant's actual hiring and the evaluation on the competency during actual work may be accurately predicted from the interview video. Further, in regard to the training as well, the results on actual hiring and actual work that are hidden inside the video may also be trained in addition to training related to the superficial evaluation on the video.

Figure 8:
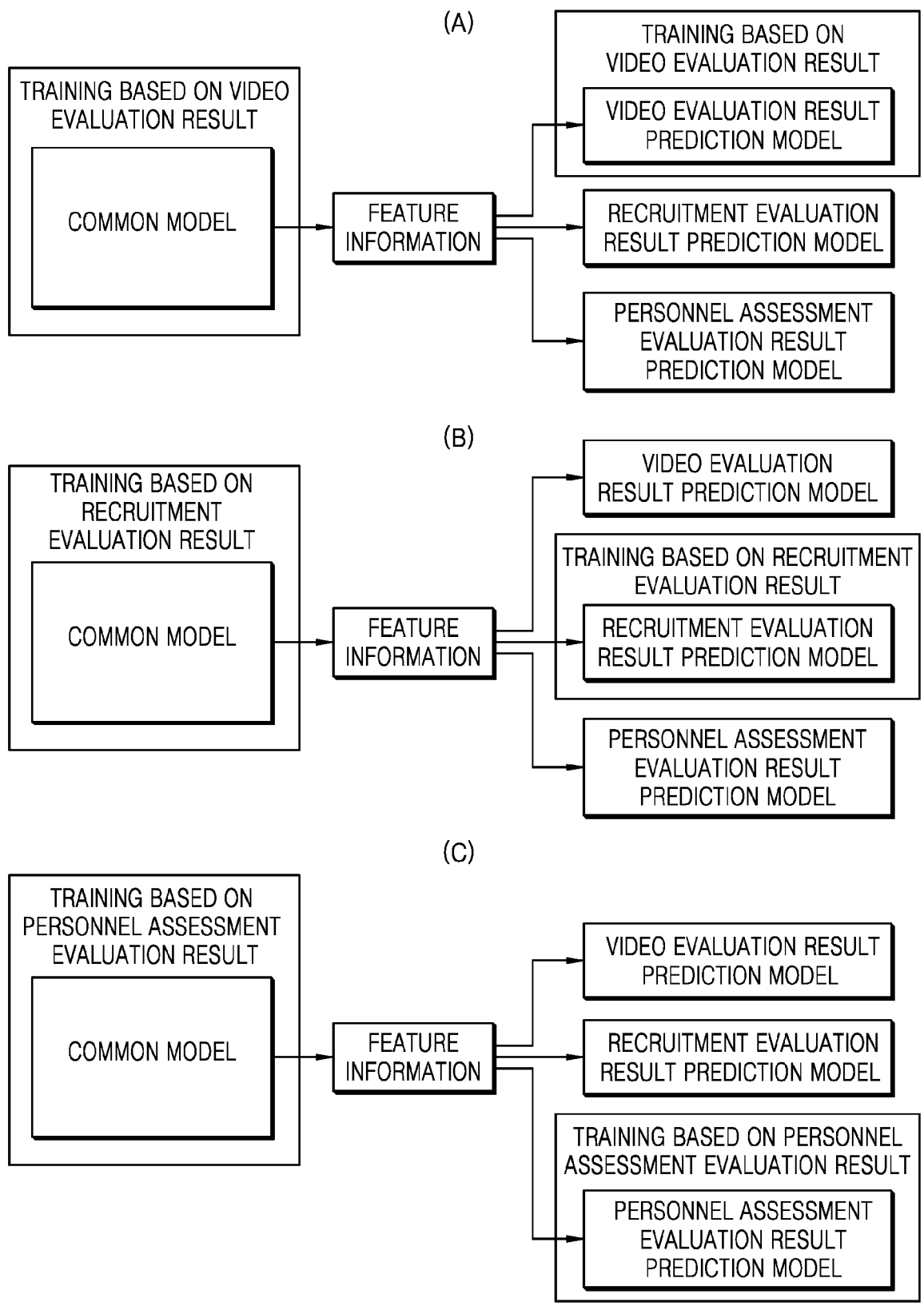
FIG. 8 schematically shows training steps of the evaluation model according to one embodiment of the present invention.

FIG. 8 schematically shows training steps of the evaluation model according to one embodiment of the present invention.

FIG. 8(A) shows that the common model and the video evaluation result prediction model among the detailed evaluation models are trained, based on the corresponding interview video and the video evaluation result by the video evaluation result training unit 1610. FIG. 8(*b*) shows that the common model and the recruitment evaluation result prediction model among the detailed evaluation models are trained, based on the corresponding interview video and the recruitment evaluation result by the recruitment evaluation result training unit 1620. FIG. 8(*c*) shows that the common model and the personnel assessment evaluation result prediction model among the detailed evaluation models are trained, based on the corresponding interview video and the personnel assessment evaluation result by the personnel assessment evaluation result training unit 1630.

Due to the above-mentioned configuration and training scheme of the detailed evaluation model, the common model may be trained through any evaluation result, and accordingly, the evaluation model may be trained so as to derive an evaluation result of another category through an evaluation result of a specific category. For example, when the applicant of the corresponding interview video is evaluated on the personnel assessment after actual hiring, and the evaluation model is trained as shown in FIG. 8(C) based on the personnel assessment evaluation result and the interview video at the time of the applicant's application, the common model may be trained, and accordingly, the accuracy of the model may also be improved in the prediction of the video evaluation result and the prediction of the recruitment evaluation result.

The common model, the video evaluation result prediction model, the recruitment evaluation result prediction model, and the personnel assessment evaluation result prediction model shown in FIG. 8 may correspond to separate types of artificial neural network models or may correspond to sub-networks of one artificial neural network model. In other words, the terms of the evaluation model, the common model, the video evaluation result prediction model, the recruitment evaluation result prediction model, and the personnel assessment evaluation result prediction model according to the present invention may signify artificial neural network models that are individually separated, and are required to be interpreted in the broadest range that signifies the sub-networks inside the artificial neural network model.

When the common model, the video evaluation result prediction model, the recruitment evaluation result prediction model, and the personnel assessment evaluation result prediction model shown in FIG. 8 correspond to the sub-networks of one artificial neural network model, the common characteristics shown in FIG. 8 may correspond to an intermediate result value inside the artificial neural network model.

In addition, when the common model, the video evaluation result prediction model, the recruitment evaluation result prediction model, and the personnel assessment evaluation result prediction model shown in FIG. 8 correspond to the sub-networks of one artificial neural network model, the common model, the video evaluation result prediction model, the recruitment evaluation result prediction model, and the personnel assessment evaluation result prediction model may substantially correspond to one artificial neural network model, the one artificial neural network model may derive a result value composed of one or more parameters, and the result value may be in the form of including all of the predicted, predicted recruitment evaluation result, and the predicted personnel assessment evaluation result. In the above case, the video evaluation result is inputted as training data for the training in FIG. 8(A), the recruitment evaluation result is inputted as training data for the training in FIG. 8(B), and the personnel assessment evaluation result is inputted as training data for the training in FIG. 8(C). In the above case, the training may be performed centering on related sub-networks in the artificial neural network model.

Figure 9:
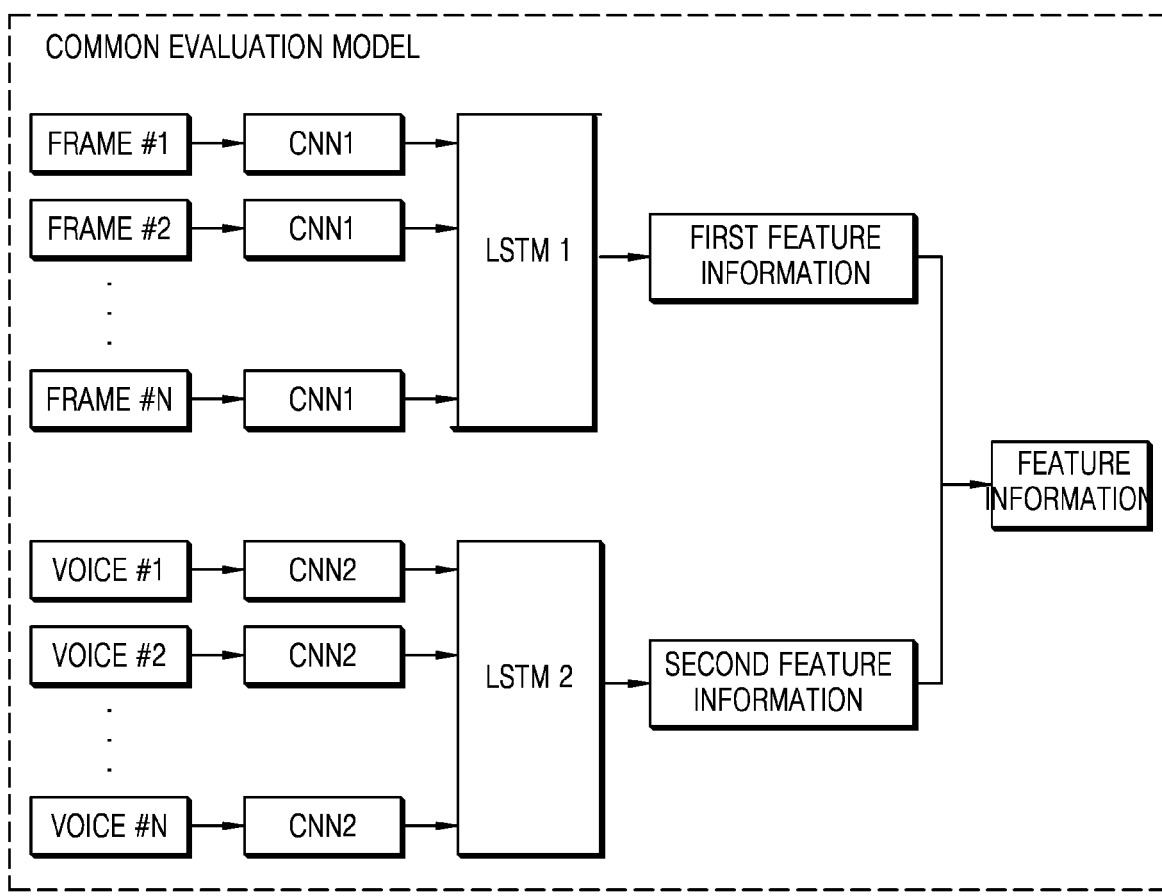
FIG. 9 schematically shows an internal configuration of the common evaluation model according to one embodiment of the present invention.

FIG. 9 schematically shows an internal configuration of the common evaluation model according to one embodiment of the present invention.

The common evaluation model according to the embodiment shown in FIG. 9 includes: a first deep neural network for extracting spatial feature information for deriving a plurality of video feature information from video information on a plurality of frames of the interview video; a first deep neural network for extracting spatial feature information for deriving a plurality of voice feature information from a plurality of voice information of the interview video; a first recurrent neural network module for receiving the plurality of video feature information to derive first feature information; and a second recurrent neural network module for receiving the plurality of voice feature information and deriving second feature information.

The first deep neural network and the second deep neural network may correspond to a CNN module and the like. In one embodiment shown in FIG. 9, the first deep neural network may correspond to a first CNN module, and the second deep neural network may correspond to a second CNN module.

The first recurrent neural network module and the second recurrent neural network module may correspond to an LSTM module and the like. In one embodiment shown in FIG. 9, the first recurrent neural network module may correspond to a first LSTM module, and the second recurrent neural network module may correspond to a second LSTM module.

Hereinafter, operations of the neural network according to one embodiment of the present invention will be described based on the embodiment shown in FIG. 9.

The plurality of frames may be generated by dividing images of the video at preset time intervals. In addition, the plurality of video feature information derived by the first CNN module may be preferably inputted to the first LSTM module in time series sequence.

Meanwhile, it may be preferable that feature information (such as pitch and intensity) on the voice in a preset time period, or data of the voice itself is inputted to the second CNN module, and the voice feature information derived from the second CNN module is inputted to the second LSTM module in time series sequence.

Meanwhile, the feature information (vector column) as an output of the common model is derived based on the first feature information and the second feature information. For the simplest way, the feature information may be derived by simply combining the first feature information and the second feature information, or may be derived by applying a weight or the like.

Figure 10:
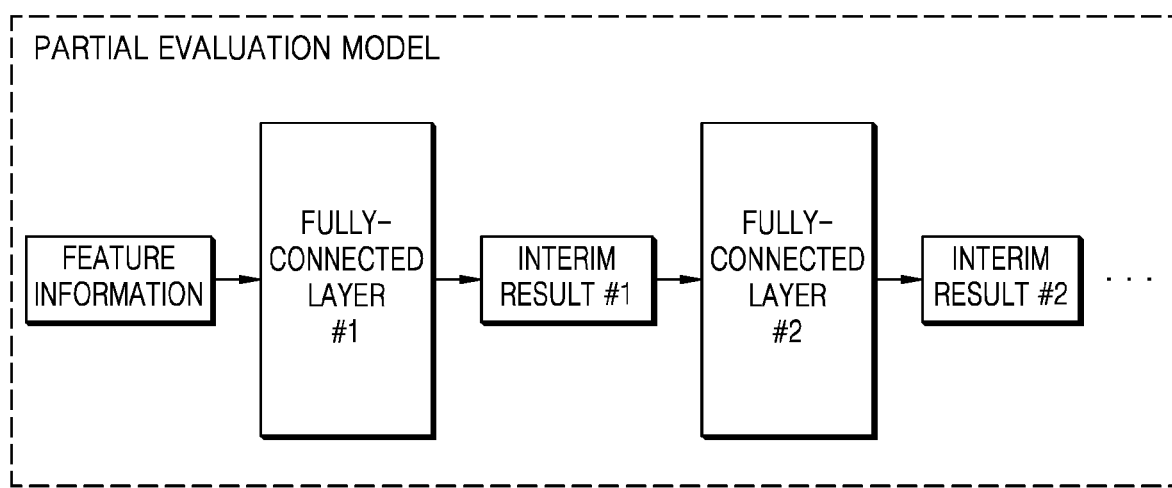
FIG. 10 schematically shows an internal configuration of the partial evaluation model according to one embodiment of the present invention.

FIG. 10 schematically shows an internal configuration of the partial evaluation model according to one embodiment of the present invention.

The partial evaluation model shown in FIG. 10 may correspond to the video evaluation result prediction model, the recruitment evaluation result prediction model, or the personnel assessment evaluation result prediction model shown in FIG. 8.

Each partial evaluation model performs a process of deriving a representative vector by assigning a weight trained by a plurality of fully-connected layers to the feature information derived from the common model, so that a result value for each evaluation category is derived.

For example, the video evaluation result prediction model may derive data related to the prediction for the video evaluation result related to the interview including one or more of favorable impression, concentration, trustworthiness, liveliness, composure, communication ability, eye contact, kindness, use of habits, and pleasantness. The recruitment evaluation result prediction model may derive data related to the prediction for the recruitment evaluation result including one or more of application motive, challenging spirit, professionalism, cooperation, and company talent matching information that are judged when the applicant undergoes an actual recruitment evaluation of the company. The personnel assessment evaluation result prediction model may derive data related to a personnel assessment evaluation result including one or more of work diligence, management competency, job competency, and comprehensive personnel assessment grade that are judged when the applicant is actually hired by the applied company and then undergoes personnel assessment evaluation.

Preferably, one embodiment of the present invention may further include a detailed evaluation model configured to derive a comprehensive evaluation result from the feature information derived from the common model with respect to the given interview video, or derive a comprehensive evaluation result from one or more of the video evaluation result prediction model, the recruitment evaluation result prediction model, and the personnel assessment evaluation result prediction model.

Figure 11:
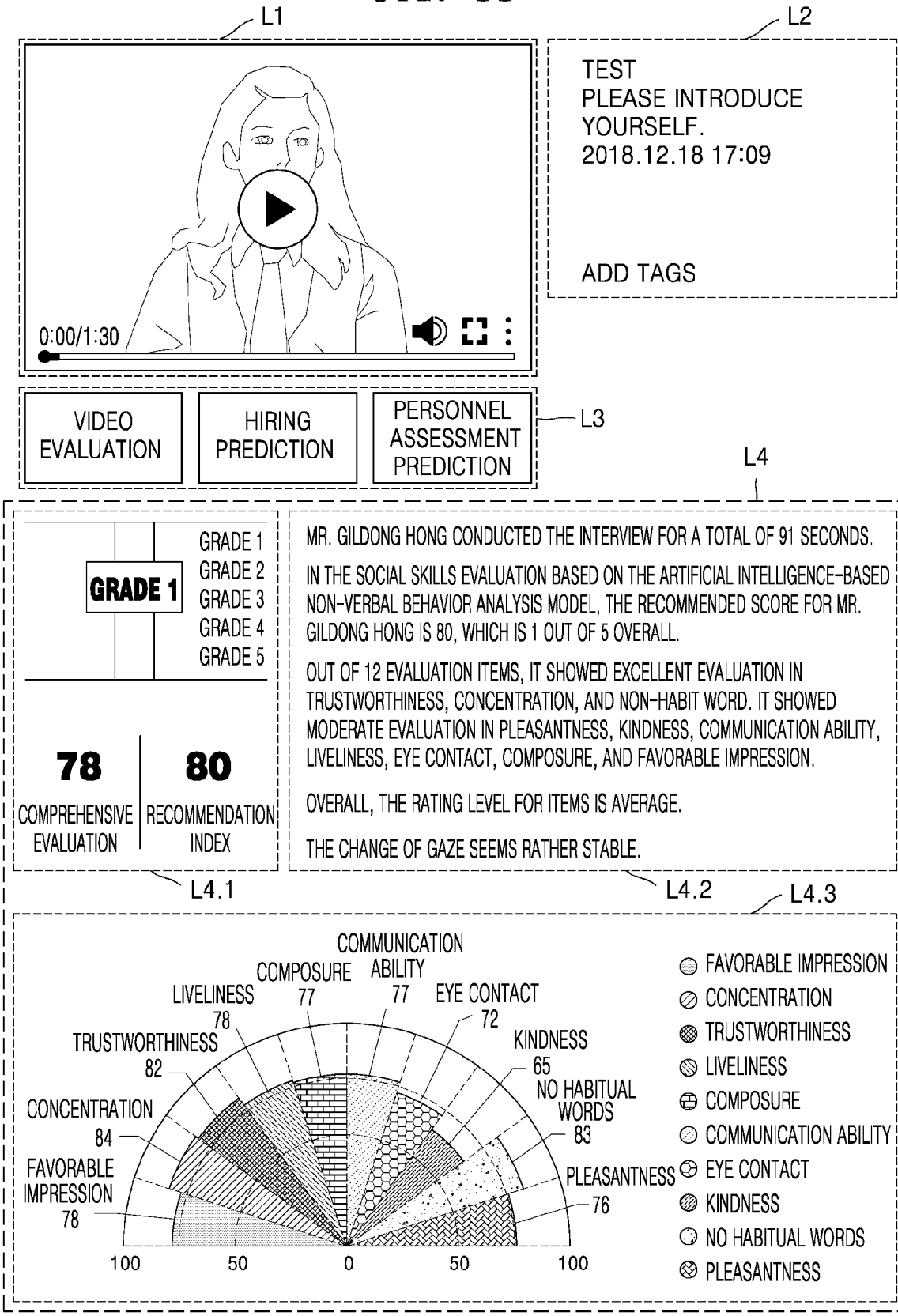
FIG. 11 shows an example of a display screen in the user terminal by the operation of the evaluation result providing unit according to one embodiment of the present invention.

FIG. 11 shows an example of a display screen in the user terminal by the operation of the evaluation result providing unit 1500 according to one embodiment of the present invention.

The evaluation result providing unit 1500 may provide various evaluation screens to the company applied by the applicant according to inputs from the terminal. FIG. 11 shows a screen for providing the evaluation result for the corresponding interview video (when the user inputs the video evaluation result in L3 of FIG. 11).

The display element in the user terminal provided by the evaluation result providing step includes: a video layer L1 capable of reproducing the interview video; a video information layer L2 on which identification information, date, explanatory information, and the like for the interview video may be displayed; a category layer L3 in which two or more evaluation result categories are configured to be selected; and an automatic evaluation result layer L4 in which an automatic evaluation result for the evaluation result category selected among the two or more evaluation result categories is displayed.

Figure 12:
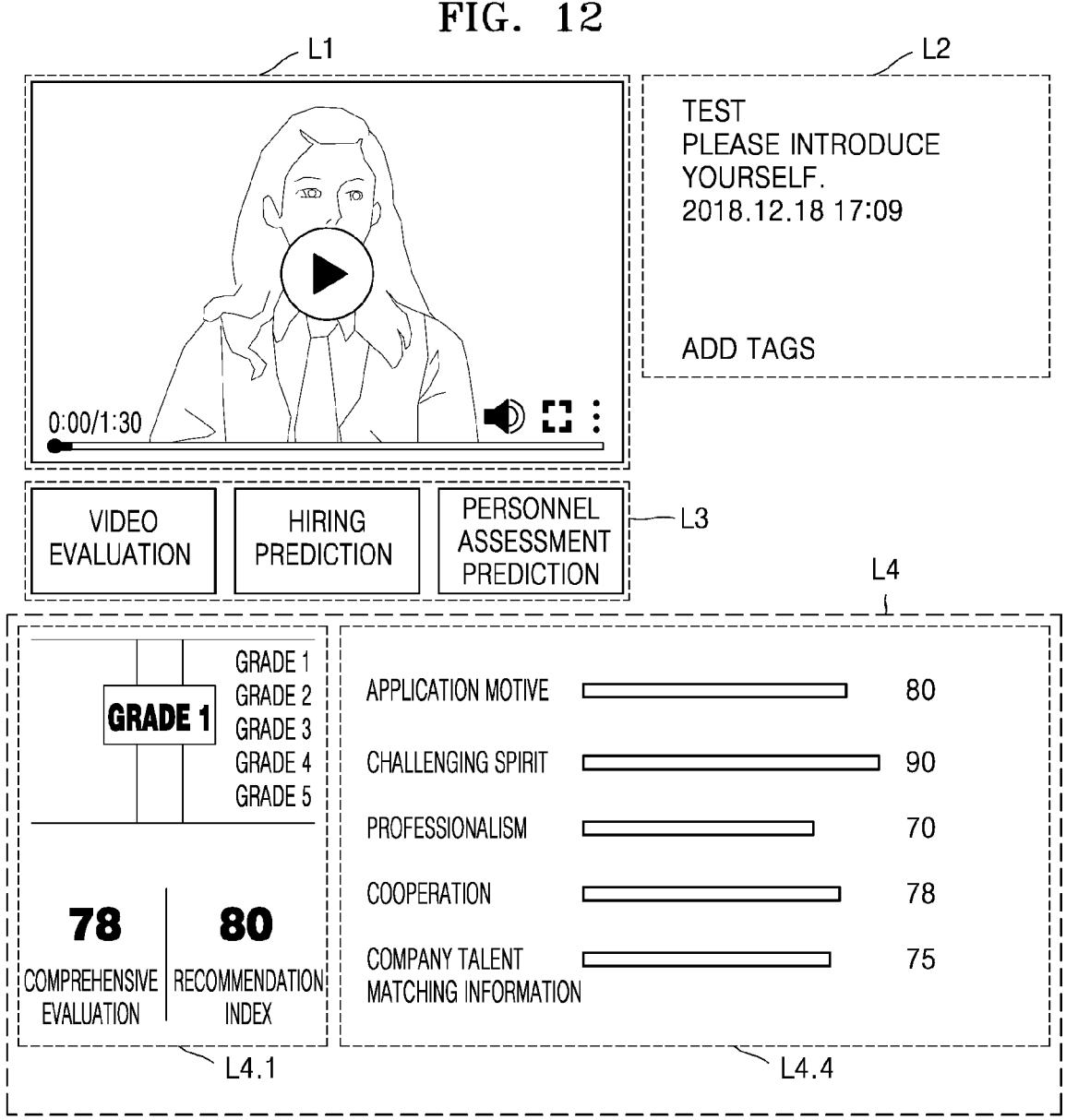
FIG. 12 shows an example of a display screen in the user terminal by the operation of the evaluation result providing unit according to one embodiment of the present invention.
Figure 13:
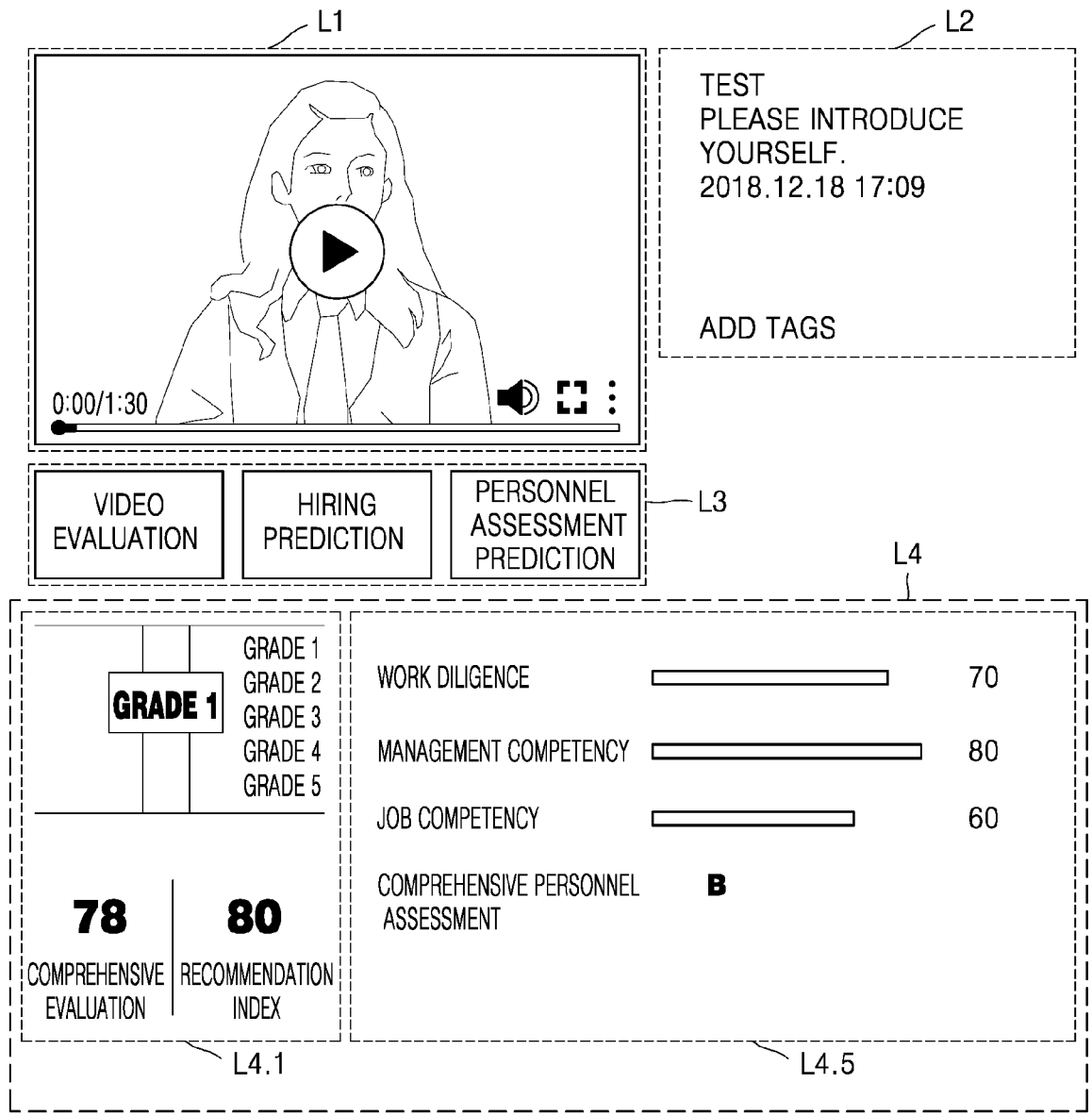
FIG. 13 shows an example of a display screen in the user terminal by the operation of the evaluation result providing unit according to one embodiment of the present invention.

In other words, the screen in the user terminal provided by the evaluation result providing step includes a first screen displayed while focusing on the evaluation factors of the interview video itself (FIG. 11), a second screen displayed while focusing the result prediction upon actually hiring the applicant of the interview video (FIG. 12), and a third screen displayed whole focusing on the result (or personnel assessment) prediction when the applicant of the interview video performs the actual job (FIG. 13).

The interview video may be played in the video layer L1 according to a user's input.

In the category layer L3, the provided screen is switched as the evaluation result category is changed according to the user's input. The 'video evaluation' of the category layer L3 corresponds to a screen that provides the evaluation of the interview video itself. Preferably, the 'video evaluation' corresponds to a screen that displays the evaluation results on social skills such as hiring recommendation, favorable impression, concentration, trustworthiness, and the like according to the operations of the common model and the video evaluation result prediction model.

In FIG. 11 where the 'video evaluation' is selected, the evaluation prediction results related to the video evaluation results are displayed in the automatic evaluation result layer L4 (L4.2 and L4.3). Preferably, the automatic evaluation result layer may include a comprehensive evaluation layer L4.1 that displays a comprehensive evaluation result on the interview video based on the evaluation values of one or more detailed evaluation models trained by the video evaluation result, and one or more detailed evaluation models trained by the recruitment evaluation result.

When the above information is provided, the recruiting company may be intuitively provided with the evaluation on the social skills in the interview video, even without checking the interview video one by one during the online interview.

Preferably, L4.3 shown in FIG. 11 corresponds to the evaluation factor for the interview video itself.

FIG. 12 shows an example of a display screen in the user terminal by the operation of the evaluation result providing unit 1500 according to one embodiment of the present invention.

FIG. 12 is a screen showing, in L4.5, result values of the recruitment evaluation on the applicant predicted by the evaluation model from the interview video, for example, the automatic evaluation result on one or more of application motive, challenging spirit, professionalism, cooperation, and company talent matching level. Accordingly, the evaluation model of the present invention provides, based on the interview video, the prediction result at the time when the applicant actually undergoes an offline interview and finally receives a recruitment evaluation result, so as to provide the evaluation prediction at the time of recruitment evaluation, which is difficult to confirm through the online interview, for the actual corresponding company, so that the recruiting company can efficiently conduct online interviews.

Preferably, L4.4 shown in FIG. 12 corresponds to a prediction factor for the actual recruitment result inferred from the corresponding interview video.

FIG. 13 shows an example of a display screen in the user terminal by the operation of the evaluation result providing unit 1500 according to one embodiment of the present invention.

FIG. 13 is a screen showing, in L4.6, result values predicted by the evaluation model from the interview video when the applicant receives the job evaluation after actually hired, for example, the automatic evaluation result on one or more of work diligence, management competency, job competency, and comprehensive personnel assessment. Accordingly, when assumed that the actual applicant is hired, from the interview video, the evaluation model of the present invention provides the prediction result when receiving evaluation on job competency such as personnel assessment evaluation, thereby providing the evaluation prediction, which is difficult to confirm through the online interview, during actual work at the company, so that the recruiting company can conduct online interviews efficiently.

Preferably, L4.5 shown in FIG. 13 corresponds to a prediction factor for the actual job evaluation inferred from the corresponding interview video.

Figure 14:
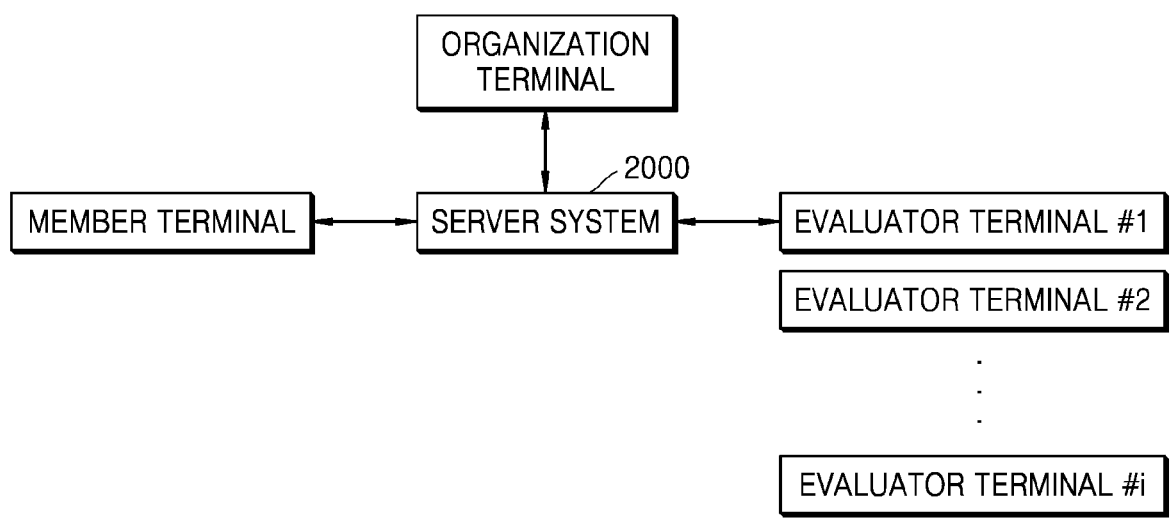
FIG. 14 schematically shows an overall system form of a method for providing interview preparation services according to one embodiment of the present invention.

Method, System and Computer-Readable Medium for Training Automatic Evaluation Model for Interview Video FIG. 14 schematically shows an overall system form that provides an interview preparation service or an automatic evaluation result on the interview video of the subject according to one embodiment of the present invention. In the system shown in FIG. 14, the interview video may be received from a member terminal in an automated manner, and the automatic evaluation result on soft skills and the like through the machine-trained evaluation model with respect to the received interview video may be provided to the member terminal or connected organization terminal. Various interview videos may be collected based on the above evaluation model.

The server system shown in FIG. 14 may be used such that the applicant watches the automatic evaluation on the interview video of the applicant through the member terminal and conducts improvements, or may also be used as a system for conducting an actual online interview for a specific organization of the applicant. In the above case, the interview result on the interview video received from the member terminal may be transmitted to the terminal of the organization.

In addition, the server system shown in FIG. 14 may be used in the form of accessing the evaluator terminal to input evaluation information. In the above case, the evaluation model training unit of the server system may train and improve the automatic evaluation model based on the evaluation information inputted from the evaluator terminal.

Accordingly, the server system shown in FIG. 14 may perform complex functions of transmitting the result and the like on the interview video received from the member terminal to one or more of the organization terminal, the evaluator terminal, and the member terminal, and transmitting the evaluation result received from the evaluator terminal to the organization terminal, or improving the automatic evaluation model of the server system based on the evaluation result.

Hereinafter, the server system of the present invention will be described with focusing on the method for receiving evaluation results from one or more evaluator terminals, and training the evaluation model of the server system based on the received evaluation result.

The member terminal, the evaluator terminal, and the organization terminal of FIG. 14 may correspond to the user terminal described above, and the server system 2000 corresponds to a computing device including at least one processor and at least one memory.

The member terminals, the evaluator terminals, and the organization terminal may access to the server system 2000 through a web browser program, or may access the server system 2000 through a dedicated application.

The member terminals, the evaluator terminals, and the organization terminal may log in to the server system 2000 through an account of each user to use services of the server system 2000.

The member terminals, the evaluator terminals, and the organization terminal may log in to the server system 2000 through a different type of account, for example, a member (applicant) type account, an evaluator type account, and an organization (such as a company that conducts the recruitment) type account.

Hereinafter, the configuration of the server system 2000 will be described in more detail.

In the case that the online interview actually proceeds, the member terminal may correspond to a terminal of an applicant who wants to actually apply for company recruitment or the like.

Figure 15:
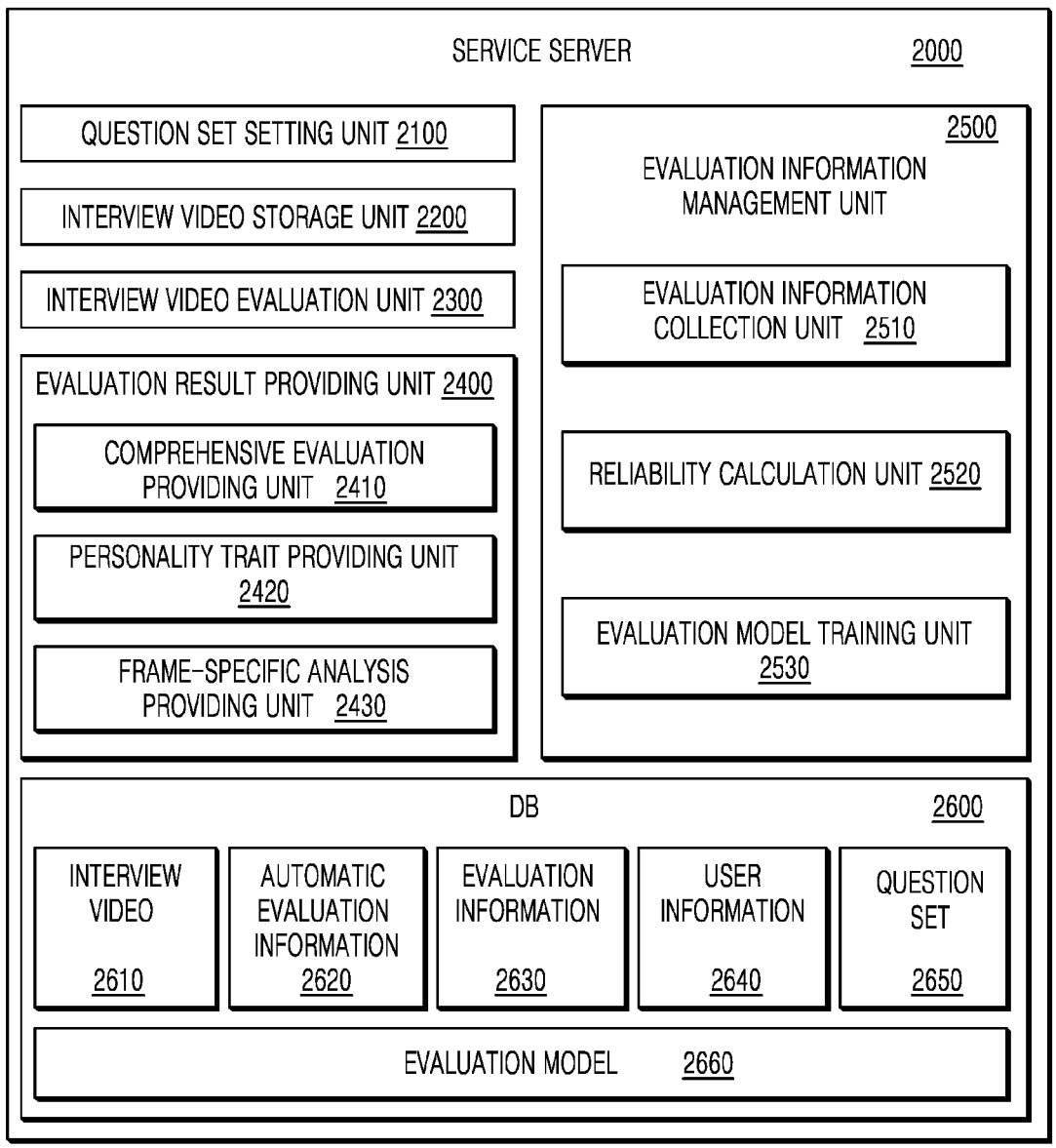
FIG. 15 schematically shows an internal configuration of the service server according to one embodiment of the present invention.

FIG. 15 schematically shows an internal configuration of the server system 2000 according to one embodiment of the present invention.

The server system 2000 of the present invention may provide a coaching service to improve skills related to online interview for general applicants. Primarily, the interview video is received from the member terminal and evaluation information on the received interview video is provided, so that the user of the member terminal may be provided with feedback on the interview video of the user.

Alternatively, the server system 2000 of the present invention may also be used as a system for conducting online interviews with actual companies. For example, the applicant may transmit the interview video to the server system through the member terminal, and the server system may provide the received interview video and/or automated evaluation information to the organization terminal.

Alternatively, the server system 2000 of the present invention may perform operations for further improving the evaluation model, which automatically generates the evaluation information, used in the above two using examples.

Meanwhile, the server system of the present invention may be implemented in the form of physically including a plurality of servers rather than a single server. For example, an evaluation model training unit 2530 may be configured as a separate physical server. In addition, an evaluation model 2660 included in a DB 2600 may also be implemented as a separate server.

A question set setting unit 2100 sets up a question set according to the user's input.

Preferably, the user may stepwise input information on the organization to which the user wants to apply, and the server system 2000 may provide the user with questions (questions that have been asked or may be asked in an interview of a company or the like) corresponding to information on the corresponding organization. Preferably, the question set setting unit 2100 may provide the user with an interface for stepwise inputting the type of organization (such as company, public institution), the name of company (such as Samsung Electronics and Bank of Korea), occupational group (such as software position and administrative position).

The server system 2000 stores information on the questions corresponding to application information such as each company and occupational group, and provides a corresponding question list according to the user's input.

Thereafter, the user may create a question set by selecting questions that the user wants to test from the entire question set.

Alternatively, when the server system conducts an actual online interview, the question set setting unit 2100 generates a question set based on a question list for a company to which the applicant wants to apply.

Thereafter, an interview video storage unit 2200 described later may sequentially or randomly extract the questions in the question set and transmit the questions to the member terminal, and the user may figure out the question from the member terminal, record a response video using the member terminal, and transmit the recorded response video to the server system 2000. Operations of the interview video storage unit 2200 may correspond to those of the interview video storage unit 1200 described with reference to FIG. 4.

Meanwhile, the question set may not be provided in the above manner. A common question set that may be asked by most companies may be initially provided, or a question set may be provided by randomly extracting and composing questions from the questions stored in the server system 2000 without a user's detailed input. Alternatively, when the user executes the function by the interview video storage unit 2200 without setting the question set, a question set based on a preset rule may be created or questions according to a preset rule may be presented.

Alternatively, when the server system 2000 performs an actual online interview, the question set setting unit 2100 may generate the question set based on information allocated to the company to which the applicant wants to apply.

The interview video storage unit 2200 may transmit one or more question information among the preset question sets to the user terminal, and receive and store the interview video formed by responding to the question information from the user terminal. The storing of the interview video storage unit is required to be construed in the broadest meaning, which includes storing in cache just enough to be reproduced, in addition to storing in a general memory device (for example, HDD) of a DB.

The question information may be implemented in the form of one or more of question text, question voice, and question video.

Specifically, in regard to the interview video storage unit 2200, the use terminal is provided with an interface for displaying or reproducing questions according to the question information, and an interview video taken by a camera and a microphone equipped in the user terminal is received from the user terminal and stored in the DB 2600 together with an identifier for the interview video.

The interview video evaluation unit 2300 may generate automatic evaluation information on the interview video through an evaluation model using machine training.

In other words, the server system 2000 may receive the interview video and then automatically perform the evaluation using the evaluation model, thereby generating automatic evaluation information. The automatic evaluation information may include one or more of: a comprehensive evaluation factor related to the interview including one or more of favorable impression, concentration, trustworthiness, liveliness, composure, communication ability, eye contact, kindness, use of habits, and pleasantness; and quantitative information on a personality trait including one or more of openness, conscientiousness, extraversion, affinity, and neuroticism, and an attitude feature including one or more of gaze treatment, head movement, voice pitch, voice pitch, voice volume, and emotion.

Preferably, the evaluation model includes one or more deep learning-based trained artificial neural network modules. The evaluation model may correspond to a form using the trained artificial neural network module and the preset rule-based evaluation module in combination. The above interview video evaluation unit 2300 may correspond to the interview video evaluation unit 1300 described with reference to FIG. 5.

The evaluation result providing unit 2400 provides the automatic evaluation result to the user terminal based on the automatic evaluation information. Specifically, the evaluation result providing unit 2400 may transmit the automatic evaluation information and data having a format processed with the automatic evaluation information (data related to the implementation of the interface in which the automatic evaluation information is reflected) to the member terminal, and the member terminal may display various evaluation information in a web browser and dedicated application according to the user's selection.

Preferably, the evaluation result providing unit 2400 includes: a comprehensive evaluation providing unit 2410 that provides a comprehensive evaluation factor related to the interview including one or more of favorable impression, concentration, trustworthiness, liveliness, composure, communication ability, eye contact, kindness, use of habits, and pleasantness; a personality trait providing unit 2420 that provides a personality trait factor including one or more of openness, conscientiousness, extraversion, affinity, and neuroticism; and a frame-specific analysis providing unit 2430 that provides factor such as one or more attitude features, such as gaze treatment, head movement, voice pitch, voice pitch, voice volume, and emotion, in partial unit of the interview video.

The frame-specific analysis providing unit 2430 may provide feature evaluation information according to a partial unit of the interview video, for example, a frame, a frame section, a time, and a time section. In the terms for the frame-specific analysis providing unit, the 'frame' will be understood as not denoting a single frame, but denoting a partial unit of the interview video.

The automatic evaluation result derived from the evaluation result providing unit 2400 may be transmitted to the member terminal when the server system is used to prepare for an interview of a member. When the actual member terminal functions as the applicant's terminal to conduct an online interview for recruitment or the like, the automatic evaluation result may be transmitted to a terminal of the organization that intends to conduct recruitment or the like.

The basic operation of the present invention is to provide an automatic evaluation service for the interview video received from the member terminal.

Meanwhile, according to one embodiment of the present invention, the server system may be used to train the evaluation model. The above function is performed by an evaluation information management unit 2500. In other words, the evaluation information management unit 2500 may perform a method of training the evaluation model that provides automatic evaluation results on the interview video of the subject to be evaluated.

The evaluation information management unit 2500 includes: an evaluation information collection unit 2510 for collecting evaluation information on a plurality of evaluators for the corresponding interview video; a reliability calculation unit 2520 for calculating reliability information for the evaluators from the evaluation information of the evaluators; and an evaluation model training unit 2530 for training the evaluation model by using the calculated reliability information and the evaluation information.

The evaluation information collected by the evaluation information collection unit 2510 may be provided to the organization terminal, and more preferably, may be used to train the evaluation model through the evaluation model training unit 2530.

More preferably, according to the present invention, various interview videos may be collected through the operations of the evaluation result providing unit, and the evaluation model may be further improved through the evaluation model training unit 2530 with respect to the interview videos.

The evaluation model training unit 2530 trains the evaluation model using the machine training based on the evaluation information of the evaluator. In other words, when a real human evaluator evaluates the interview video, the information is provided to the organization terminal or the member terminal, and the present invention further reinforces the evaluation model by using the evaluation information of the evaluator.

When the evaluation information management unit 2500 is used in the above manner, the member can be provided with a more realistic interview evaluation, and the server system 2000 can utilize data generated in the above process so as to automatically and continuously improve the performance of the evaluation model.

Meanwhile, the DB 2600 of the server system 2000 may store an interview video 2610 received from the member terminal, automatic evaluation information 2620 performed by the interview video evaluation unit 2300 with respect to the interview video, evaluation information 2630 collected by the evaluation information collection unit 2510, and/or reliability information of the evaluator and other user information 2640, and a question set 2650 as information related to questions, and the evaluation model used by the interview video evaluation unit 2300 to evaluate the interview video and additionally trained by the evaluation model training unit 2530.

The server system 2000 shown in FIG. 15 may further include other components in addition to the shown components. However, for convenience, only the components related to performing the online interview, providing an interview preparation service, and training the evaluation model according to the embodiments of the present invention are indicated.

Figure 16:
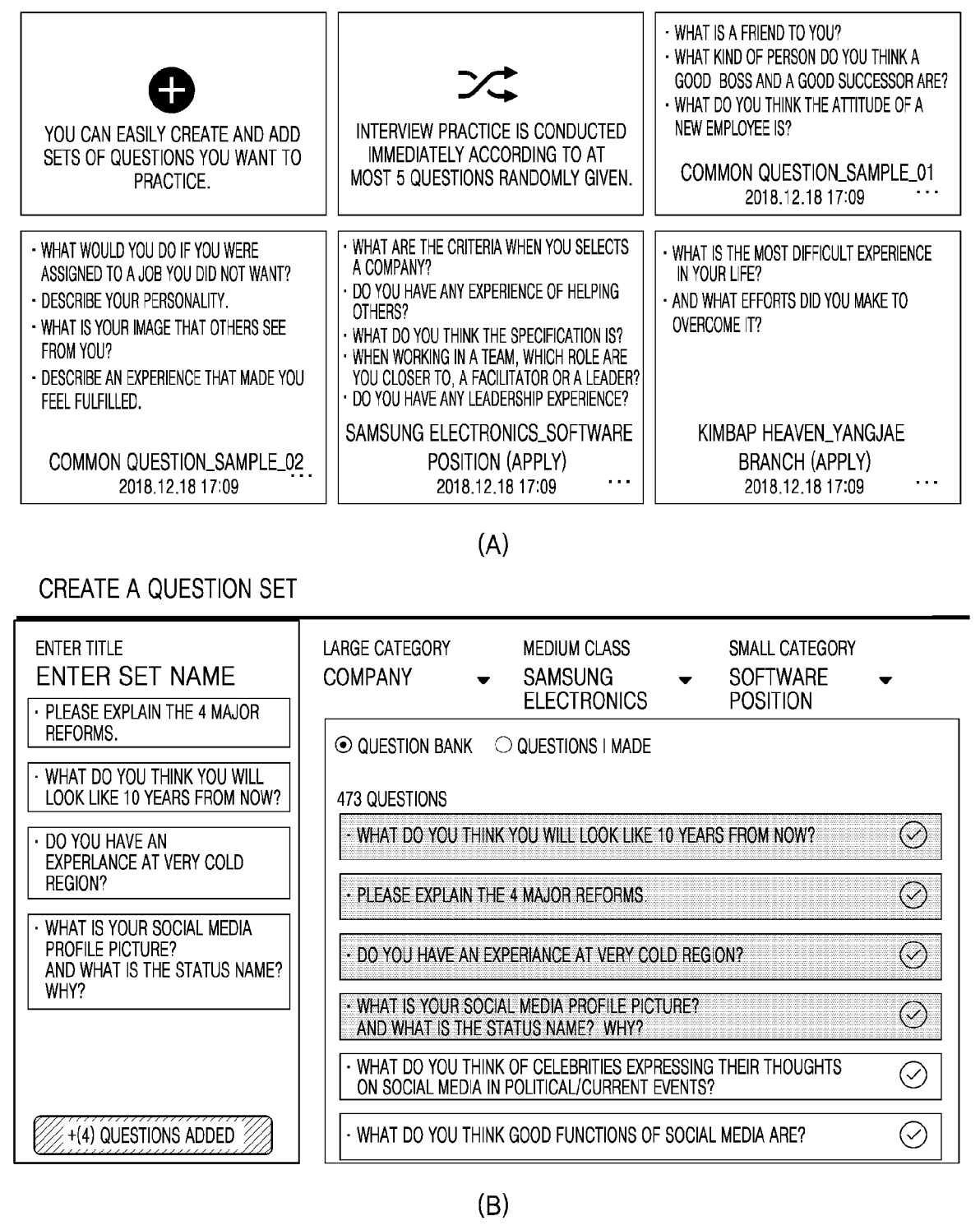

FIG. 16 schematically shows a display screen in the user terminal according to execution of the question set setting unit 2100 according to one embodiment of the present invention.

Preferably, the question set may be created and managed for each member's account. FIG. 16(A) shows initial display screens of the member terminal by the question set setting unit 2100.

FIG. 16A displays information on a question set that has already been created or is given initially. The information on the question set may include questions of the corresponding question set, identification information of the question set, and a created date of the question set. In addition, an interface element for allowing the user to create a question set may be displayed as shown in the first box, and an interface element for randomly creating a question set and immediately executing the interview video storage unit 2200 may be displayed as shown in the second box.

FIG. 16(B) shows a screen when the user enters the first box on the screen (A) of the member terminal provided by the question set setting unit 2100.

As shown in the upper layer of FIG. 16 (B), the user may select a large category (type of organization), a medium category (name of organization), and a small category (occupational group in the organization).

Thereafter, the question bank or the question I made may be selected in a middle layer of FIG. 16(B). When the question bank is selected, questions previously stored in the server system 2000 according to the user's selected large category, medium category, and small category are displayed.

The user may add questions to a question set to be currently set while inputting (for example, clicking) the questions, and the questions added in the above manner are displayed on a left layer, so that the user may conveniently set up the question set including the questions that the user wants to practice.

When the server system 2000 of the present invention performs an actual online interview, the question set setting unit may not provide the interface as shown in FIG. 16, and the questions set for the corresponding organization to be applied may be provided to the member terminal based on preset rules.

FIG. 17 schematically shows a display screen in the user terminal according to execution of the comprehensive evaluation providing unit 2410 of the evaluation result providing unit 2400 according to one embodiment of the present invention.

The evaluation result providing unit 2400 may provide various evaluation screens to the member terminal according to input from the member terminal, the evaluator terminal, the organization terminal and the like. FIG. 17 shows a screen for providing a comprehensive evaluation (when the user inputs the 'AI total' of L3 in FIG. 17).

The display element in the user terminal provided by the evaluation result providing step includes: a video layer L1 capable of reproducing the interview video; a video information layer L2 on which identification information, date, explanatory information, and the like for the interview video may be displayed; a category layer L3 in which two or more evaluation result categories are configured to be selected; and an automatic evaluation result layer L4, L5 and L6 in which an automatic evaluation result for the evaluation result category selected among the two or more evaluation result categories is displayed.

The interview video may be played in the video layer L1 according to a user's input.

In the category layer L3, the provided screen is switched as the evaluation result category is changed according to the user's input. The 'AI total' of the category layer L3 refers to providing the evaluation result by the comprehensive evaluation providing unit 2410, the 'personality trait' refers to providing the evaluation result by the personality trait providing unit 2420, and the 'frame-specific analysis' refers to providing the evaluation result by the frame-specific analysis providing unit 2430.

In other words, the screen in the user terminal provided by the evaluation result providing step includes a first screen that displays factors for evaluation on the entire interview video (screens of FIGS. 17 and 18 displayed by the comprehensive evaluation providing unit 2410 or the personality trait providing unit 2420), and a second screen that displays factors for evaluation on partial units of the interview video (screens of FIGS. 19 to 22 displayed by the frame-specific analysis providing unit 2430).

A plurality of evaluation information is displayed and the evaluation information based on the automatic evaluation information is displayed, in a layer of the automatic evaluation result of FIG. 17 (L4, L5, L6 may correspond thereto).

The plurality of evaluation information includes: quantified values for one or more of favorable impression, concentration, trustworthiness, liveliness, composure, communication ability, eye contact, kindness, use of habitual words, and pleasantness; a comprehensive evaluation score, grade information, and recommendation index based on the quantified values; and text evaluation information automatically written based on the evaluation information.

FIG. 18 schematically shows a display screen in the user terminal according to execution of the personality trait providing unit 2420 of the evaluation result providing unit 2400 according to one embodiment of the present invention.

The evaluation result providing unit 2400 may provide various evaluation screens to the member terminal according to input from the member terminal. FIG. 18 shows a screen that provides the personality trait evaluation according to input from member terminal (when the user enters the personality trait of L3 in FIG. 18).

The display element in the user terminal provided by the evaluation result providing step includes: a video layer L1 capable of reproducing the interview video; a video information layer L2 on which identification information, date, explanatory information, and the like for the interview video may be displayed; a category layer L3 in which two or more evaluation result categories are configured to be selected; and an automatic evaluation result layer L7 in which an automatic evaluation result for the evaluation result category selected among the two or more evaluation result categories is displayed.

A plurality of evaluation information is displayed and the evaluation information based on the automatic evaluation information is displayed, in an automatic evaluation result layer L7 of FIG. 18.

The plurality of evaluation information may include quantitative or graded information on one or more personality trait of openness, conscientiousness, extraversion, affinity, and neuroticism.

FIG. 19 schematically shows a display screen in the user terminal according to execution of the frame-specific analysis providing unit 2430 of the evaluation result providing unit 2400 according to one embodiment of the present invention.

The display element in one embodiment of the screen of the user terminal displayed by the frame-specific analysis providing unit 2430 of the evaluation result providing unit 2400 according to the user's input includes: a video layer L1 capable of reproducing the interview video; a video information layer L2 on which identification information, date, explanatory information, and the like for the interview video may be displayed; a category layer L3 in which two or more evaluation result categories are configured to be selected; and an automatic evaluation result layer L7 that displays factors for evaluation on partial units of the interview video.

As shown in FIG. 19 the video layer L1 displays the interview video and a video timing element E1 indicating a time or frame position of the interview video; and the automatic evaluation layer L7 displays a graph element that indicates the quantified values for the evaluation factor according to the time or frame of the interview video as a graph, and a graph timing element E2 indicating a time or frame position of the graph element.

The automatic evaluation layer L7 of FIG. 19 shows a graph of the evaluation index according to a stream of the time or frame. Accordingly, the applicant may determine whether the applicant has consistently maintained the evaluation index as a whole, which timing has a problem, or which timing preferably proceeds.

When the video timing element is changed according to input from the user terminal, for example, when the user clicks and drags the video timing element E1, the graph timing element E2 may be changed to correspond to the change of the video timing element E1.

Alternatively, when the graph timing element E2 is changed according to input from the user terminal, the video timing element E1 may be changed to correspond to the change of the graph timing element E2.

For example, when a low or unstable evaluation index is indicated in a specific section in the automatic evaluation layer L7, the user may move the graph timing element E2 to the corresponding section. In the above case, the video timing element E1 in the video layer is moved to a timing or frame position corresponding to the position to which the graph timing element E2 is moved, and the user may enter to play the video at the above state, thereby immediately figuring out the video of the user in the corresponding section.

FIGS. 19(A) and 19(B) exemplarily show the interworking process between the graph timing element E2 and the video timing element E1 as described above. When the graph timing element E2 is moved to a specific position as shown in FIG. 19(B), the video timing element E1 is moved to a position corresponding to the position of the graph timing element E2.

Figure 20:
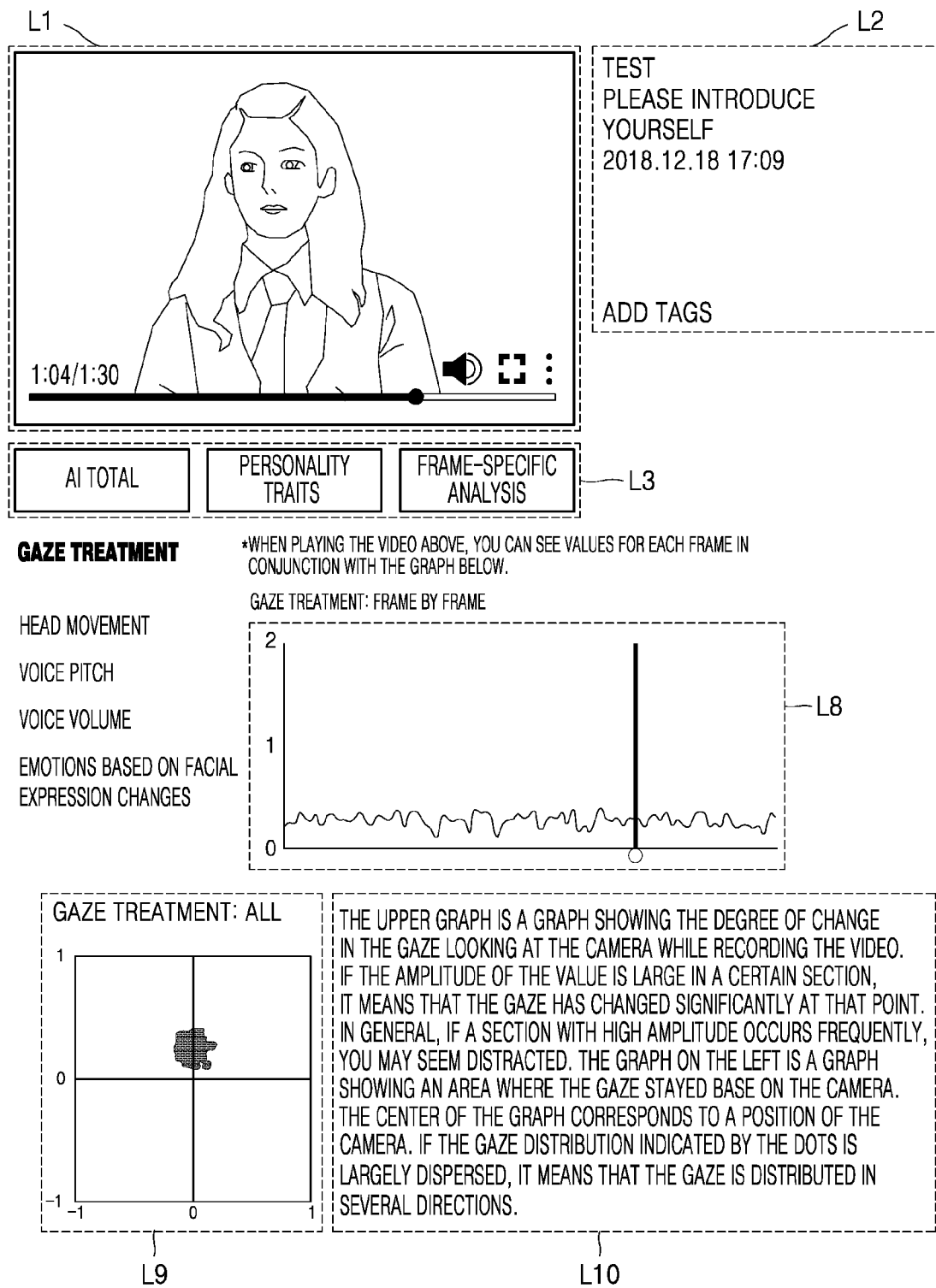
FIG. 20 schematically shows a display screen in the user terminal according to execution of the gaze treatment result provision by the frame-specific analysis providing unit of the evaluation result providing unit according to one embodiment of the present invention.

FIG. 20 schematically shows a display screen in the user terminal according to execution of the gaze treatment result provision by the frame-specific analysis providing unit 2430 of the evaluation result providing unit 2400 according to one embodiment of the present invention.

The automatic evaluation information derived by the above-described interview video evaluation unit 2300 may include a plurality of position information of the user's gaze in a plurality of frames of the interview video.

In other words, the interview video evaluation unit 2300 may derive information on the position of the gaze for each frame or for each specific time section by considering image information and the like of the user's eyes.

Thereafter, the frame-specific analysis providing unit 2430 of the evaluation result providing unit 2400 may provide the gaze treatment result according to the user's input, and accordingly, the provided display element in the user terminal may include a position of the gaze, a variation amount, or a degree of suitability of gaze treatment according to the time section or frame section shown in the automatic evaluation layer L7.

Preferably, the screen displayed by providing the gaze treatment result may include a gaze information layer L8 that displays a cumulative gaze treatment result, and a gaze information description layer L9 that displays a description of the gaze treatment result.

As shown in FIG. 20, the gaze information layer L8 may indicate and overlap a plurality of graphic elements in a background layer for directly or indirectly indicating a center of the gaze so as to determine positions in the background layer according to a plurality of position information of the user's gaze.

In the above manner, the user may check gaze change information over time through the automatic evaluation layer L7, and simultaneously, may check an average position of the user's gaze through the gaze information layer L8. In addition, when the user checks the frame or timing having severe gaze fluctuation in the automatic evaluation layer L7, and accordingly, the graph timing element E2 is positioned to the corresponding timing, the video timing element E1 may be automatically moved to the corresponding position in the video layer L1, and the user may simply clicks a video play button, so that the user can quickly identify the appearance upon severe gaze fluctuation.

FIG. 21 schematically shows a display screen in the user terminal according to execution of the head movement result provision of the frame-specific analysis providing unit 2430 of the evaluation result providing unit 2400 according to one embodiment of the present invention.

The automatic evaluation information derived by the above-described interview video evaluation unit 2300 may include information on the degree of user's head movement in a plurality of frames of the interview video.

In other words, the interview video evaluation unit 2300 may consider the user's head image information and the like, thereby deriving information on the degree of head movement for each frame or for each specific time section.

Thereafter, the frame-specific analysis providing unit 2430 of the evaluation result providing unit 2400 may provide the head movement result according to the user's input, and accordingly, the provided display element in the user terminal may include an average position of head, an average height of head, or a degree of head movement according to the time section or frame section shown in the automatic evaluation layer L10.

In the above manner, the user may check information related to the head movement over time through the automatic evaluation layer L10. In addition, when the user checks the frame or timing having severe head movements in the automatic evaluation layer L7, and accordingly, the graph timing element E2 is positioned to the corresponding timing, the video timing element E1 may be automatically moved to the corresponding position in the video layer L1, and the user may simply clicks a video play button, so that the user can quickly identify the appearance upon severe head movements.

FIG. 22 schematically shows a display screen in the user terminal according to execution of the emotion result provision by the frame-specific analysis providing unit 2430 of the evaluation result providing unit 2400 according to one embodiment of the present invention.

The frame-specific analysis providing unit 2430 of the evaluation result providing unit 2400 may provide the emotion change result according to the user's input, and accordingly, the provided display element in the user terminal may include an emotion layer L11 including graphs of emotion according to time sections or frame sections.

The emotion layer L11 may show the degree of each emotion such as anger, fear, and surprise according to time sections or frame sections.

It is preferable that the emotion layer L11 may show graph by applying different colors for emotions, respectively, and each emotion is displayed with a color.

A comprehensive emotion layer L12 shows information on the emotional factors of the entire video, and preferably, the ratio of each emotional factor may be shown through the graphic element as shown in FIG. 22.

When the above user interface is used, the user may check an appearance of the user that makes others feel as if the user has a specific emotion during interview. Likewise, when the user checks the frame or timing in which a specific emotion was strong or weak in the emotion layer L11, accordingly, the graph timing element E2 is positioned to the corresponding timing, the video timing element E1 may be automatically moved to the corresponding position in the video layer L1, and the user may simply clicks a video play button, so that the user can quickly identify the appearance of the user at the time when the emotion is strong or weak.

Figure 23:
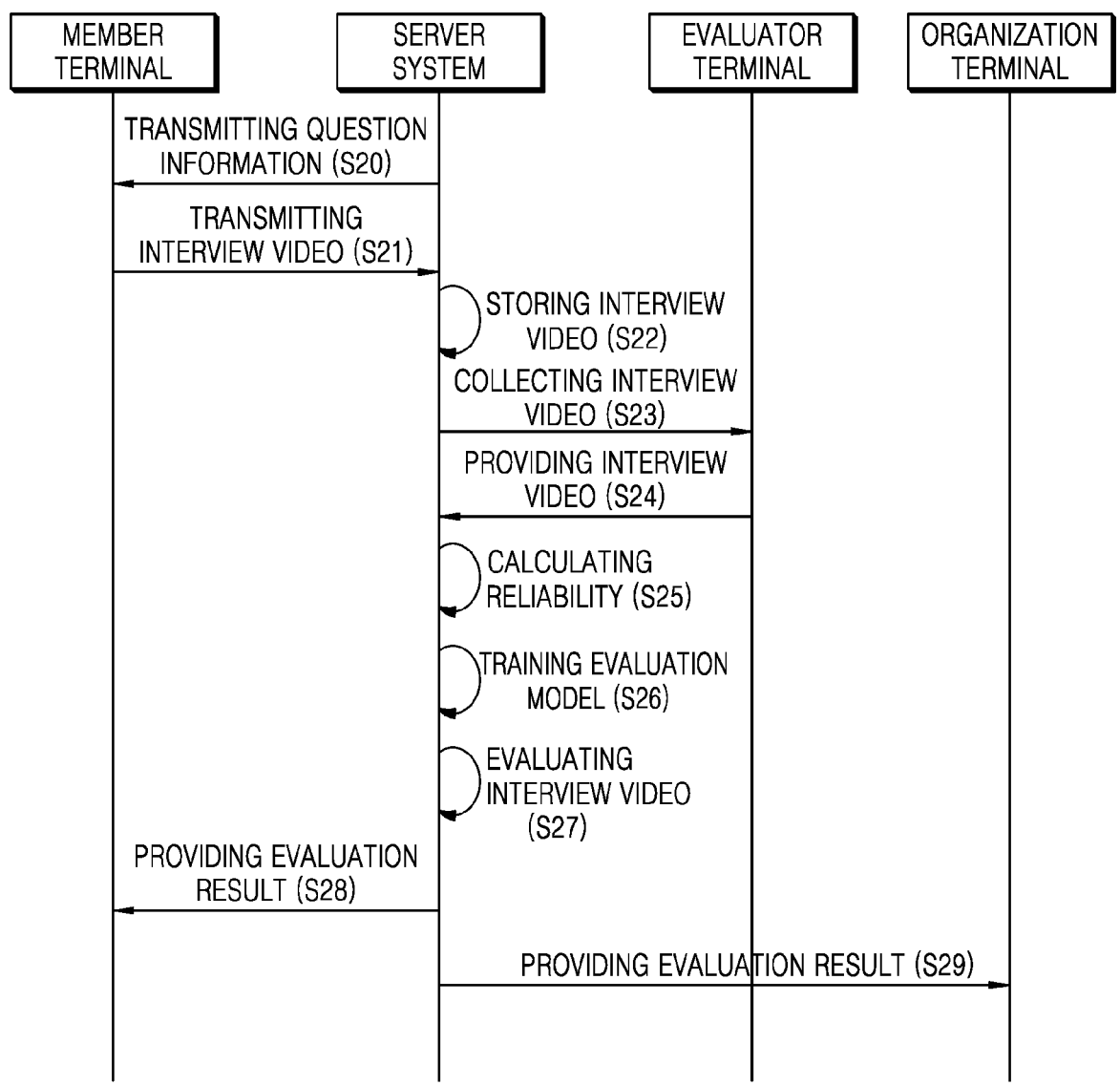
FIG. 23 schematically shows steps related to the evaluation model training according to some embodiments of the present invention.

FIG. 23 is schematically shows steps related to the evaluation model training according to some embodiments of the present invention.

The interview video evaluation unit 2300 described with reference to FIG. 15 may generate the automatic evaluation information by using one or more evaluation models of the server system 2100. Meanwhile, the one or more evaluation models may include one or more machine-trained evaluation modules, and correspond to the automatic evaluation result derived based on the machine-trained evaluation module with respect to the evaluation on favorable impression, concentration, trustworthiness, liveliness, composure, communication ability, eye contact, kindness, no habitual words, and pleasantness of FIG. 17, openness, conscientiousness, extraversion, affinity, and neuroticism of FIG. 18, and the emotion of FIG. 22.

Hereinafter, a method for improving the machine-trained evaluation module will be described.

The method of training the evaluation model that provides automatic evaluation results on the interview video of the subject to be evaluated according to one embodiment of the present invention may be performed in the server system 2000 having one or more processors and one or more memories. According to one embodiment of the present invention, the method may be performed by the evaluation information management unit 2500 of the server system 2000 in FIG. 15.

The above method for training the evaluation model includes: an interview video storage step (S20, S21, S22) of transmitting one or more question information among the preset question sets to the user terminal, and receiving and storing the interview video formed by responding to the question information from the user terminal; providing the interview video to the evaluator terminal (S23); an evaluation information collection step (S24) of collecting evaluation information of a plurality of evaluators with respect to the interview video; a reliability calculation step (S25) of calculating reliability information on the evaluators from the evaluation information of the evaluators; an evaluation model training step (S26) of training the evaluation model by using the calculated reliability information and the evaluation information; an evaluation result providing step (S27) of deriving an automatic evaluation result on the interview video by the trained evaluation model; and evaluation result providing steps (S28, S29) of transmitting the evaluation result including the automatic evaluation result to user terminals of the member, evaluator and the like.

The interview video storage steps (S20, S21 and S22) may be performed by the interview video storage unit 2200 of FIG. 2.

The step of providing the interview video to the evaluator terminal (S23), and the evaluation information collection step (S24) of collecting evaluation information of a plurality of evaluators with respect to the interview video may be performed by the evaluation information collection unit 2510 of FIG. 2. The evaluation information collection unit 2510 may be implemented in the form of collecting evaluation information from the evaluator terminal without step S23.

The reliability calculation step (S25) of calculating reliability information on the evaluators from the evaluation information of the evaluators, and the evaluation model training step (S26) of training the evaluation model by using the calculated reliability information and the evaluation information may be performed by the reliability calculation unit 2520 and the evaluation model training unit 2530 of FIG. 2, respectively.

The evaluation result providing step (S27) of deriving an automatic evaluation result on the interview video by the trained evaluation model, and the evaluation result providing steps (S28, S29) of transmitting the evaluation result including the automatic evaluation result to user terminals of the member, evaluator and the like may be performed by the interview video evaluation unit 2300 and the evaluation result providing unit 2400 of FIG. 2, respectively.

The method for training the evaluation model according to one embodiment of the present invention includes: an evaluation result providing step of providing the automatic evaluation result based on the evaluation model for the interview video to the user terminal of the organization to which a person who records the interview video wants to apply. The above step may correspond to step S29 of FIG. 23. In this case, the server system 2000 may function as a server that performs an actual online interview.

Preferably, the server system 2000 includes evaluation models according to applied organizations, respectively. In other words, in the case there are company A, company B and company C, the server system 2000 provide automatic evaluation results to company A, company B, and company C by different evaluation models for the interview videos of applicants who apply to company A, company B, and company C, respectively. In other words, each company may be provided with the automatic evaluation result according to the evaluation model that reflects each company's talent evaluation criteria.

In the above case, in the evaluation model training step, the evaluation model is trained by the evaluation information of the evaluator corresponding to the applied organization.

In other words, the evaluation model of company A is trained or re-trained based on the evaluation result on the interview video by an evaluator of company A, for example, a personnel team of company A. In the above manner, the server system 2000 of the present invention can provide the automatic evaluation results to personnel teams by reflecting talent images of the companies, respectively.

When the evaluation models are trained for the companies, respectively, the evaluation models are continuously or temporarily trained by the evaluation information of the evaluators of the companies, respectively. According to one embodiment of the present invention, a basic evaluation model is provided, and thereafter, the evaluation model may be trained by the evaluation information management unit 2500 of the server system 2000 for each company.

Meanwhile, when the evaluation model for deriving the automatic evaluation result of each company is trained by the evaluation information of the evaluator for each company, and when the bias of the evaluator of each company is reflected, the accuracy of the evaluation model may be reduced.

In particular, the evaluation model based on company-specific evaluation data is reinforced by management of each company. In this case, the reinforcement may be conducted independently and separately from the company that provides the service of the server system 2000, and an incorrect training may occur.

According to one embodiment of the present invention, in order to prevent the above incorrect training, the evaluation model may be trained based on the evaluation results by a plurality of evaluators, in which the evaluation model may be trained according to tentative consensus results of the evaluators by minimizing the impact due to bias by the evaluators.

Further, in the operation of the server system 2000 according to one embodiment of the present invention, the evaluation results on online interviews of actual applicants for a specific company may be used to determine whether to hire the actual applicants, and simultaneously, may also be used to improve the evaluation model that derives the automatic evaluation result for the online interview of the specific company. Thereafter, the evaluators of the specific company may conduct the online interview while referring to or using the automatic evaluation results of the trained or improved evaluation model.

In the operation of the server system of the present invention, the sequence of the detailed steps in FIG. 23 may be modified as long as the evaluation model training based on the evaluation information of the present invention and the evaluation result based on the trained evaluation model are provided.

For example, after S22 to S26 are performed with respect to a plurality of interview videos, steps S27 and S28 may be performed with respect to the interview video inputted later.

In addition, for example, the operation in the server system of the present invention may be configured such that steps S20, S21, S22, S27, and S28 may be performed based on the previously trained evaluation model to intentionally collect a wide range of interview videos that are not necessarily limited to applicants who want to apply to the company, and then steps S23, S24, S25, and S26 may be performed with respect to the collected interview videos, so as to further train the evaluation model. In the above case, according to another embodiment of the present invention, the information on the reliability of each evaluator calculated in S25 or feedback information on the reliability may be forwarded to each evaluator or an organization of the evaluator. In this way, after the evaluation model is trained while reflecting reliability and evaluation information of the evaluator of the company, the organization (company) performs the actual online interview, thereby actually performing S20, S21, and S27 and S28 may be provided to the company.

In other words, the steps of FIG. 23 merely show one embodiment of the sequence of steps subject to the operation or use of the server system of the present invention, and the scope of the present invention is not limited thereto.

FIG. 24 schematically shows a data format of the evaluation information of the evaluator received by the evaluation information collection unit 2510 according to some embodiments of the present invention.

FIG. 24(A) shows evaluation information inputted by a plurality of evaluators in the case of a single evaluation item.

FIG. 24(B) shows evaluation information inputted by a plurality of evaluators in the case of a plurality of evaluation items. In other words, according to one embodiment of the present invention, the evaluation information may be evaluation scores inputted by a plurality of evaluators with respect to a plurality of evaluation items of the evaluators for the corresponding interview video, respectively, as shown in FIG. 24(B).

One or more items of the evaluation information may correspond to one or more of the various evaluation items shown in FIGS. 17 to 11. The evaluation information collection unit 2510 of the server system 2000 may collect evaluation information including evaluation scores of single or multiple evaluation items by the evaluators.

FIG. 25 shows an example of evaluation information data of a plurality of evaluators according to the present invention.

In the reliability calculation step (S25), reliability information for a plurality of evaluators is calculated from the evaluation information of the evaluators. For example, assume that there are evaluators A, B, C, and D as members of the personnel team of the company. When an evaluation result of D is significantly different from evaluation results of evaluators A, B, and C with respect to the same interview video and evaluation items, there is a possibility that an error occurred in the evaluation result of evaluator D, or there is a possibility that evaluator D made a judgment far from a human resource determination standard of the personnel team of the company.

Accordingly, one embodiment of the present invention, rather than training the evaluation model by using the evaluation information of the evaluators without any change, may be configured to receive evaluation information by a plurality of evaluators, calculate the reliability information or reliability score of each evaluator based on the relationship between the evaluation information of the evaluators, and train the evaluation model based on the evaluation information that reflects the calculated reliability score.

In one embodiment of the present invention, the reliability information in the reliability calculation step may include a reliability score for each evaluation item by each evaluator. Preferably, for the reliability calculation step in the case of the evaluation score for a specific evaluation item by a plurality of evaluators, the reliability score is calculated as lower when a difference from the average evaluation scores of a plurality of evaluators for a specific evaluation item with respect to the video is greater.

For example, FIGS. 25(A) and 25(B) show evaluation scores of evaluators and an average value (line) of the evaluation scores of all evaluators when the evaluators A, B, C, D, E, F, G, H, I, J, and K evaluate with respect to specific evaluation items for the same interview video.

FIG. 25(A) corresponds to a case in which all evaluators derive relatively similar evaluation scores, and FIG. 25(B) corresponds to a case in which evaluators E, H and J derive evaluation scores with a large difference from other evaluators.

The reliability calculation unit 2520 of the server system 2000 calculates a relatively lower reliability score for the evaluators E, H, J or the evaluation information of the evaluators E, H, J in FIG. 25B. Thereafter, the evaluation information management unit 2500 trains the evaluation model by reflecting the reliability score calculated in the above manner.

According to the most basic embodiment of the present invention, the reliability score of each evaluator may be derived in proportion to a difference or the square of the difference from the average value of the evaluators' evaluation scores.

For example, when assumed that the evaluators A, B, C, D, and E give evaluation scores of 88, 77, 55, 70, and 80 for a specific item, and the reliability is inversely proportional to the square of the difference from the average value of the evaluation scores (Reliability=1/(Evaluation score−Average evaluation score)^2), each reliability may be calculated as follows.

TABLE 1

|  | Evaluator | | | | |
| --- | --- | --- | --- | --- | --- |
|  | A | B | C | D | E |
| Score | 88 | 77 | 55 | 70 | 80 |
| Average score | 74 | | | | |
| Reliability | 0.005102 | 0.111111 | 0.00277 | 0.0625 | 0.027778 |

Figure 26:
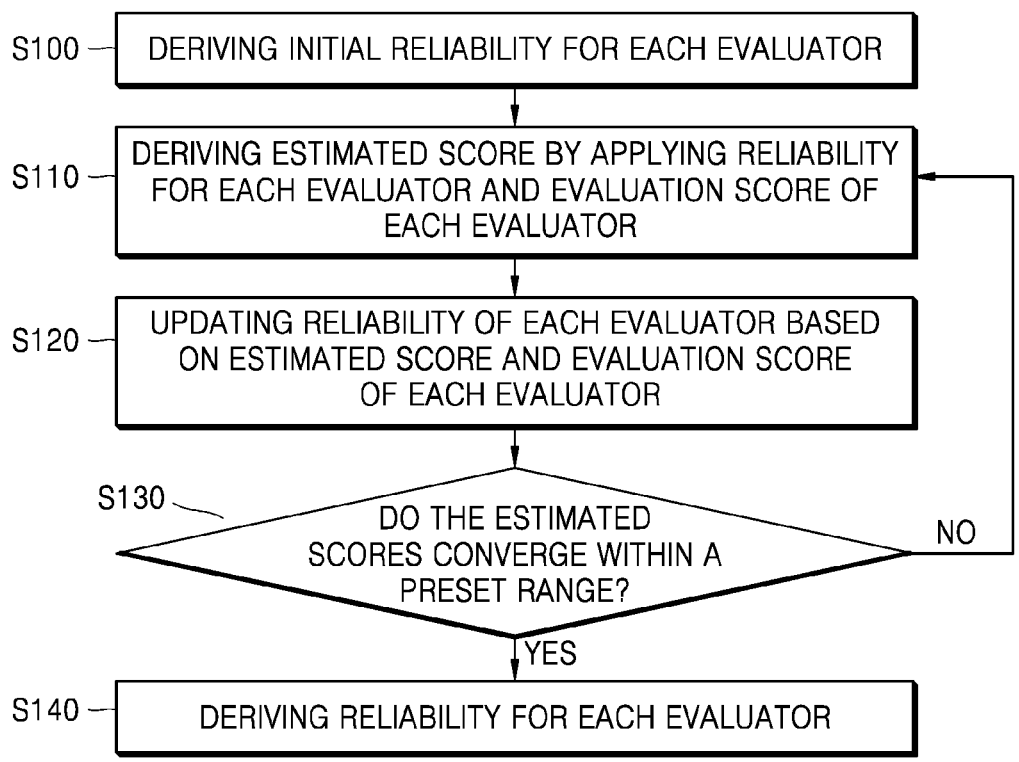
FIG. 26 schematically shows execution steps of the reliability calculation unit according to one embodiment of the present invention.

FIG. 26 schematically shows performing steps of the reliability calculation unit 2520 or detailed steps in the reliability calculation step according to one embodiment of the present invention.

The embodiment shown in FIG. 26 is configured such that an estimated score (ground truth) is determined based on the currently determined reliability of the evaluators, the process of allowing the reliability to be updated within a preset reference is repeated based on the determined estimated score and the evaluation scores of the evaluators.

In S100, initial reliability for each of the evaluators is derived for a specific evaluation item. The above initial reliability may have the same value for all evaluators or may be calculated based on previous evaluation result.

Thereafter, in step S110, a first step of deriving the estimated score is performed by applying the reliability scores for the evaluators and the evaluation scores for the evaluators for a specific evaluation item. In other words, in S110, a single estimated score is derived by applying a currently assigned evaluator-specific reliability score to the evaluator-specific evaluation score.

Preferably, the estimated score is derived by applying a higher weight to the evaluator having a higher evaluator-specific reliability score.

$$y_i = \frac{\sum_{j=1}^{K} \lambda_j y_i^j}{\sum_{j=1}^{K} \lambda_j}$$

In the above equation, $y_i$ denotes an estimated score, $y_i^j$ denotes an evaluation score of the $j^{th}$ evaluator, and $\lambda_j$ corresponds to an evaluator-specific reliability.

Thereafter, in step S120, a second step of updating the evaluator-specific reliability score is performed based on the calculated estimated score ($y_i$) and the evaluator-specific evaluation score. In other words, the evaluator-specific reliability score is updated again based on the estimated score derived from the current evaluator-specific reliability score.

In one embodiment of the present invention, the reliability score may be updated by $$\frac{1}{\lambda_j} = \frac{\sum_{i=1}^{N}(y_i^j - y_i)^2}{N}.$$

Thereafter, in step S130, a third step is performed of determining whether the estimated scores converge within a preset range based on the estimated score currently derived in the first step and one or more estimated scores derived previously.

Thereafter, when it is determined in the third step that the estimated score converges within the preset range, the calculated evaluator-specific reliability score is calculated as reliability information, and when it is determined in the third step that the estimated score does not converge within the preset range, the first step, the second step, and the third step are repeated.

The calculation of the reliability score and the calculation of the estimated score may be conducted in various ways. Specifically, an EM-type iterative optimization technique or the like may be used.

For example, when assumed that evaluators A, B, C, D, and E give evaluation scores of 88, 77, 55, 70, and 80 for a specific item, and A, B, C, D, and E have the same initial reliability, and the reliability is inversely proportional to the square of the difference from the average value of the evaluation scores (Reliability=1/(Evaluation score−Average evaluation score)^2), the reliability of the evaluators at each calculation step may be calculated as follows.

weight, to the evaluation scores by the evaluators with respect to the evaluation items.

Thereafter, the evaluation information management unit 2500 trains the evaluation model with respect to the corresponding evaluation item based on the derived comprehensive evaluation score and the corresponding interview video.

Specifically, when scores are given as 88, 77, 55, 70, and 80 by evaluators A, B, C, D and E with respect to a specific item (such as comprehensive recommendation index or liveliness) for a specific interview video, and when the reliabilities derived from the scores are 0.006, 0.339, 0.002, 0.035, and 0.449, the training on the specific item for the interview video is not conducted by 88, 77, 55, 70, and 80, and values formed by applying the reliabilities to the scores, respectively, for example, 78.353((88*0.006+77*0.339+ 55*0.002+70*0.035+80*0.449)/(0.006+0.339+0.002+ 0.035+0.449)) may be inputted as the training value.

Alternatively, in another embodiment of the present invention, the evaluation model may be trained based on the evaluation information of each evaluator by applying the reliability information, as a weight, to each evaluation information.

Figure 28:
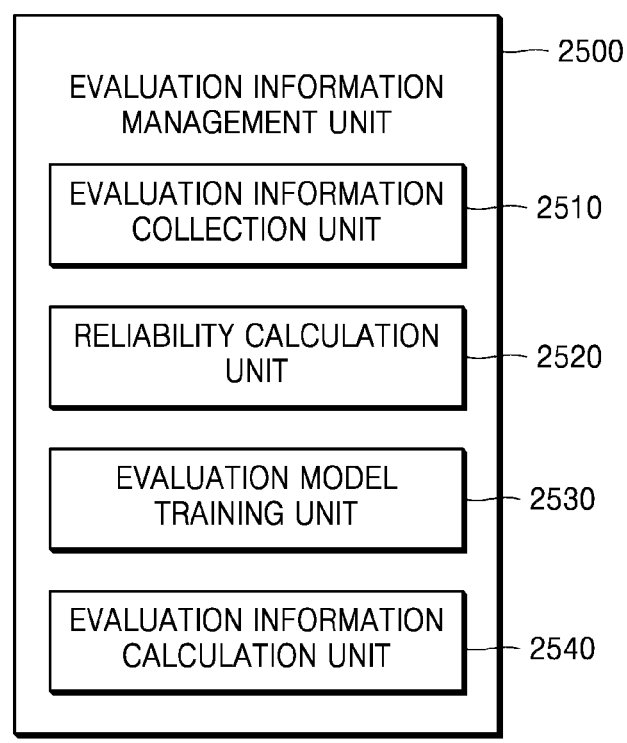
FIG. 28 schematically shows an internal configuration of the evaluation information management unit according to one embodiment of the present invention.

FIG. 28 schematically shows an internal configuration of the evaluation information management unit according to one embodiment of the present invention.

The evaluation information management unit 2500 shown in FIG. 28 includes: an evaluation information collection unit 2510 for collecting evaluation information on a plurality of evaluators for the corresponding interview video; a reliability calculation unit 2520 for calculating reliability information for the evaluators from the evaluation information of the evaluators; an evaluation model training unit 2530 for training the evaluation model by using the calculated reliability information and the evaluation information; and an evaluation information calculation unit 2540 for calculating evaluation information of the applicant based on the reliability information and the evaluation information.

In one embodiment of the present invention, the server system may be used as a system for performing an online interview. First, as described above, the evaluation model training unit 2530 trains the evaluation model of the corre-

TABLE 2

|  | Evaluator | A | B | C | D | E |
|---|---|---|---|---|---|---|
| Primary | Score | 88 | 77 | 55 | 70 | 80 |
| Primary | reliability | 1 | 1 | 1 | 1 | 1 |
| Primary | Estimated score | 74 | 74 | 74 | 74 | 74 |
| Secondary | Reliability | 0.005102 | 0.111111 | 0.00277 | 0.0625 | 0.027778 |
| Secondary | Estimated score | 75.28451 | 75.28451 | 75.28451 | 75.28451 | 75.28451 |
| Tertiary | Reliability | 0.006185 | 0.339799 | 0.00243 | 0.035809 | 0.044972 |
| Tertiary | Estimated score | 76.76426 | 76.76426 | 76.76426 | 76.76426 | 76.76426 |

Figure 27:
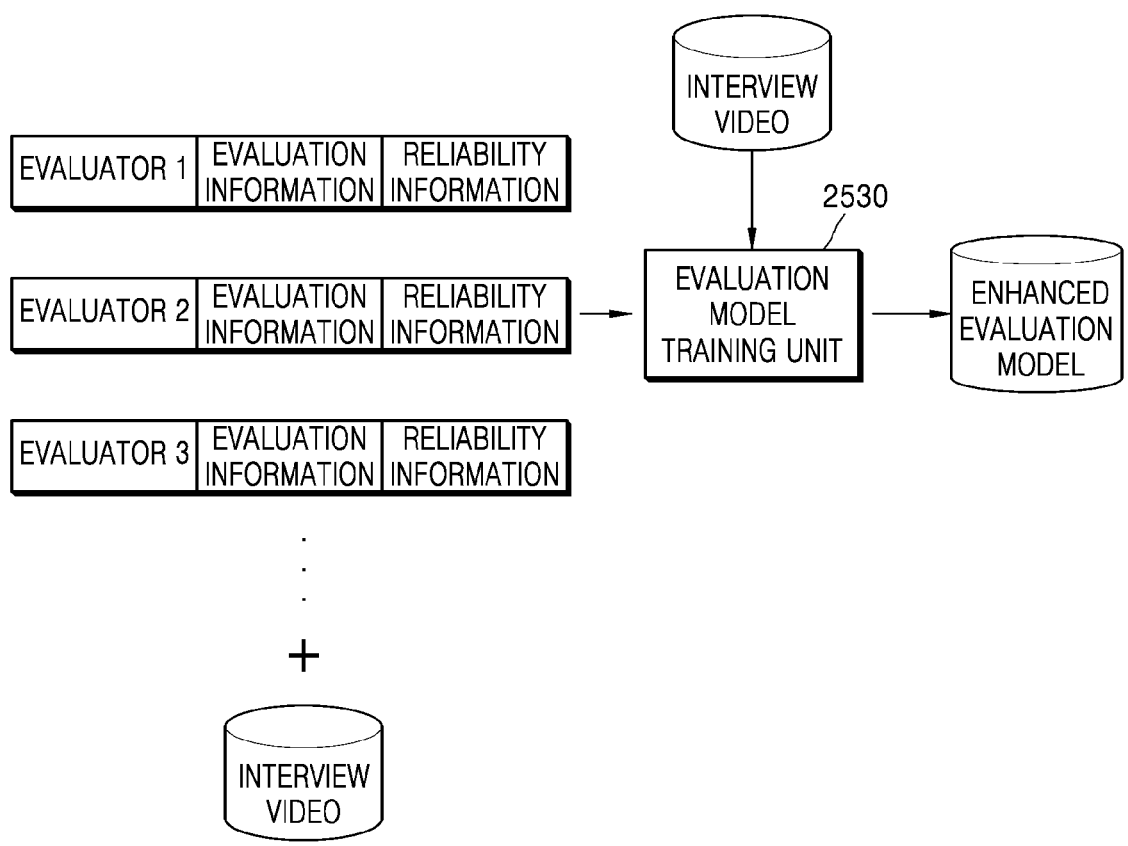
FIG. 27 schematically shows operations of the evaluation model training unit according to one embodiment of the present invention.

FIG. 27 schematically shows operations of the evaluation model training unit 2530 according to one embodiment of the present invention.

Specifically, the evaluation model training unit 2530 retrain and update the evaluation model to a reinforced evaluation model based on the evaluation information of the evaluators and the reliability information of the evaluators.

In one embodiment of the present invention, the evaluation information management unit 2500 derives a comprehensive evaluation score by reflecting the evaluator-specific reliability score included in the reliability information, as a sponding company based on the evaluation information to which the evaluator's reliability information is applied.

Thereafter, when the server system performs the online interview, the automatic evaluation result on the interview video is derived through the trained evaluation model, the evaluation information calculation unit 2540 secondarily reflects the reliability calculated by the reliability calculation unit 2520 for the evaluation information of the evaluators, so that the comprehensive score for the applicant of the interview video may be calculated. In one embodiment, the comprehensive score may be calculated based on the evaluation information to which the calculated reliability is applied. In another embodiment, the comprehensive score may be calculated based on the evaluation information to which the calculated reliability is applied and the automatic evaluation information calculated by the evaluation model.

The company side may use the above comprehensive score as a factor for determining whether to hire the applicant during the interview process.

One embodiment of the present invention may be implemented in the form of a recording medium containing instructions executable by a computer, such as a program module executed by the computer. The computer-readable media may be any available media that is accessible by the computer, and include a volatile or non-volatile media, and a removable or non-removable media. In addition, the computer-readable media may include a computer storage media and a communication media. The computer storage media may include all of volatile, non-volatile, removable and non-removable media implemented by any method or technology for storing information such as computer readable instructions, data structures, program modules or other data. The communication medium typically contains computer readable instructions, data structures, program modules, or other data of a modulated data signal such as a carrier wave, or other transmission mechanism, and includes any information delivery medium.

Although the method and system of the present invention have been described in connection with specific embodiments, some or all of components or operations thereof may be implemented using a computer system having a general hardware architecture.

It will be apparent that the above description of the present invention is merely for illustration, and a person having ordinary skill in the art may carry out various deformations and modifications within the scope without departing from the idea of the present invention, the following claims and equivalents thereof. Therefore, will be understood that the above described embodiments are exemplary and not restrictive in all aspects. For example, each component described as unitary may be implemented in a distributed manner. Likewise, components that are described as distributed may also be implemented in a combined form.

The scope of the invention is indicated by the following claims rather than the above detailed description, and all deformations or modifications derived from the idea and scope of the claims and their equivalents should be construed as being included in the scope of the present invention.

The invention claimed is:

1. A method for managing an evaluation model performed in a server system having one or more processors and one or more memories to provide an automatic evaluation result for an interview video of a subject to be evaluated, the method comprising:
    a recruitment evaluation result training step in which the evaluation model is trained to provide an automatic evaluation result for the interview video in the server system based on recruitment evaluation results from actual recruitment interviews of a company where applicants applied; and
    a personnel assessment evaluation result training step in which the evaluation model is trained to provide an automatic evaluation result of the interview video in the server system based on personnel assessment evaluation results on job competency after the applicants have been hired by the company,
    wherein the evaluation model includes one or more artificial neural network models, said artificial neural network is being updated and retrained using relevant information to learn (1) a reinforced correlation between the subject's behavior and response during the online video interview and the online video interview evaluation result and (2) a reinforced correlation between the online video interview evaluation result and the recruitment evaluation result obtained from one or more the companies;
    wherein the server system is configured to include a plurality of company evaluation models, each of which is trained based on recruitment evaluation results obtained from a corresponding company such that the company evaluation models pretrained produce different results from company to company in regard to recruitment and personnel assessment of the subject;
    wherein the company evaluation model includes:
    a common evaluation model deriving common feature information based on the interview video;
    a recruitment evaluation result prediction model deriving results related to a recruitment further evaluation result based on the common feature information;
    a personal assessment evaluation result prediction model deriving results related to the personal assessment evaluation result based on the common feature information,
    wherein the common evaluation model and the recruitment evaluation result prediction model are trained using recruitment evaluation results from actual interviews;
    wherein the common evaluation model and the personal assessment evaluation result prediction model are trained using the personnel assessment evaluation result on job competency after applicants have been hired;
    incorporating the trained artificial neural network in the server system.

2. The method of claim 1, further comprising:
    an evaluation result providing step of providing the automatic evaluation result derived based on the evaluation model to a company to be applied in the interview video with respect to the received interview video.

3. The method of claim 1, wherein the company evaluation model further includes:
    a video evaluation result prediction model for deriving an evaluation result related to the video evaluation result, based on the common feature information.

4. The method of claim 1, wherein the common evaluation model includes:
    a first deep neural network for extracting spatial feature information for deriving a plurality of video feature information from video information on a plurality of frames of the interview video;
    a first deep neural network for extracting spatial feature information for deriving a plurality of voice feature information from a plurality of voice information of the interview video;
    a first recurrent neural network module for receiving the plurality of video feature information to derive first feature information; and
    a second recurrent neural network module for receiving the plurality of voice feature information and deriving second feature information.

5. The method of claim 1, further comprising:
    an evaluation result providing step of providing an automatic evaluation result derived based on the evaluation model to a company to be applied in the interview video with respect to the received interview video, wherein the automatic evaluation result includes an evaluation prediction result related to the video evaluation result, and an evaluation prediction result related to the recruitment evaluation result.

6. The method of claim 1, further comprising:
an evaluation result providing step of providing an automatic evaluation result derived based on the evaluation model to a company to be applied in the interview video with respect to the received interview video, wherein the automatic evaluation result includes a comprehensive evaluation result on the interview video based on evaluation values of one or more detailed evaluation models trained by the video evaluation result and one or more detailed evaluation models trained by the recruitment evaluation result.

7. A server system for managing an evaluation model that provides an automatic evaluation result with respect to an interview video of a subject to be evaluated, the system comprising:
  a recruitment evaluation result training unit training the evaluation model that to provide the automatic evaluation result on the interview video of the server system based on a recruitment evaluation results of actual recruitment interviews of a company where applicants applied; and
  a personnel assessment evaluation result training unit training the evaluation model to provide an automatic evaluation result of the interview video in the server system based on personnel assessment evaluation results on job competency after the applicants have been hired by the company,
  wherein the evaluation model includes one or more machine-trained detailed evaluation models, evaluation model is being updated and retrained using relevant information to learn (1) a reinforced correlation between the subject's behavior and response during the online video interview and the online video interview evaluation result and (2) a reinforced correlation between the online video interview evaluation result and the recruitment evaluation result obtained from one or more the companies;
  wherein the server system is configured to include a plurality of company evaluation models, each of which is trained based on recruitment evaluation results obtained from a corresponding company such that the company evaluation models pretrained produce different results from company to company in regard to recruitment and personnel assessment of the subject;
  wherein the company evaluation model includes:
  a common evaluation model deriving common feature information based on the interview video;
  a recruitment evaluation result prediction model deriving results related to a recruitment evaluation result based on the common feature information;
  a personal assessment evaluation result prediction model deriving results related to the personal assessment evaluation result based on the common feature information;
  wherein the common evaluation model and the recruitment evaluation result prediction model are trained using recruitment evaluation results from actual interviews; and
  wherein the common evaluation model and the personal assessment evaluation result prediction model are trained using the personnel assessment evaluation result on job competency after applicants have been hired.

8. A non-transitory computer-readable recording medium configured to record a program for performing a method for managing an evaluation model according to claim 1.

* * * * *